US010127516B2

(12) United States Patent
Bennett et al.

(10) Patent No.: US 10,127,516 B2
(45) Date of Patent: *Nov. 13, 2018

(54) DATA SYNCHRONIZATION FOR OFFLINE PROCESSING

(71) Applicant: United Parcel Service of America, Inc., Atlanta, GA (US)

(72) Inventors: David A. Bennett, Bothell, WA (US); Paul A. Bilibin, Lynnwood, WA (US); Mark A. Bjerke, Bellevue, WA (US); Lynn S. Goldhaber, Renton, WA (US); Hsiangwen S. Hu, Redmond, WA (US); Lory E. Moon, Bremerton, WA (US); Jinyue Liu, Sammamish, WA (US); Paul R. McLaughlin, Sammamish, WA (US); Reichie R. Nelson, Everret, WA (US); Charles D. Mentzer, Sammamish, WA (US); Matthew J. Smith, Redmond, WA (US); William W. Smith, Medina, WA (US)

(73) Assignee: United Parcel Service of America, Inc., Atlanta, GA (US)

( * ) Notice: Subject to any disclaimer, the term of this patent is extended or adjusted under 35 U.S.C. 154(b) by 674 days.

This patent is subject to a terminal disclaimer.

(21) Appl. No.: 14/838,886

(22) Filed: Aug. 28, 2015

(65) Prior Publication Data

US 2015/0371188 A1 Dec. 24, 2015

Related U.S. Application Data

(63) Continuation of application No. 11/154,866, filed on Jun. 15, 2005, now Pat. No. 9,218,588.

(Continued)

(51) Int. Cl.
*G06Q 10/08* (2012.01)
*G06F 17/30* (2006.01)
(Continued)

(52) U.S. Cl.
CPC ...... *G06Q 10/08345* (2013.01); *G06F 3/0482* (2013.01); *G06F 3/04842* (2013.01);
(Continued)

(58) Field of Classification Search
CPC .. G06Q 10/08345; G06Q 10/10; G06Q 10/08; G06F 3/0482; G06F 17/30174
See application file for complete search history.

(56) References Cited

U.S. PATENT DOCUMENTS 4,713,761 A * 12/1987 Sharpe ................. G06Q 20/102
340/5.42
4,799,156 A * 1/1989 Shavit ................. G06Q 10/087
705/26.3
(Continued)

OTHER PUBLICATIONS

Eric Giguere, "Mobile Data Management: Challenges of Wireless and Offline Data Access", Proceddings 17th International Conference on Data Engineering, Apr. 2001, 227-228 (Year: 2001).*

(Continued)

*Primary Examiner* — Kevin H Flynn
*Assistant Examiner* — Omar Zeroual
(74) *Attorney, Agent, or Firm* — Shook, Hardy and Bacon, L.L.P.

(57) ABSTRACT

Embodiments of the present invention includes system and methods for the continued operation of a carrier management system having one or more user terminals that normally communicate with at least one data center over a network (online), when the one or more user terminals are unable to communicate with the data center (offline). Once communication is re-established between the one or more user terminal and the data center, local files and data on the user terminals that were used to rate and ship packages while offline are synchronized between the one or more user terminals and the data center.

13 Claims, 19 Drawing Sheets

Related U.S. Application Data

(60) Provisional application No. 60/583,865, filed on Jun. 29, 2004.

(51) Int. Cl.
  *G06Q 10/10* (2012.01)
  *G06F 3/0482* (2013.01)
  *G06F 3/0484* (2013.01)

(52) U.S. Cl.
  CPC ....... *G06F 17/30174* (2013.01); *G06Q 10/08* (2013.01); *G06Q 10/10* (2013.01)

(56) References Cited

U.S. PATENT DOCUMENTS

| | | | | |
|---|---|---|---|---|
| 4,837,701 | A | * | 6/1989 | Sansone ........... G07B 17/00024 705/404 |
| 5,008,827 | A | * | 4/1991 | Sansone ................ B07C 1/00 705/409 |
| 5,050,078 | A | * | 9/1991 | Sansone ................ B07C 3/00 705/30 |
| 5,072,401 | A | * | 12/1991 | Sansone ................ B07C 1/00 700/219 |
| 5,293,310 | A | * | 3/1994 | Carroll ................ G06Q 10/08 705/14.26 |
| 5,325,527 | A | * | 6/1994 | Cwikowski ........... G06F 9/4881 709/222 |
| 5,363,121 | A | * | 11/1994 | Freund ................ G06F 9/466 718/101 |
| 5,485,369 | A | * | 1/1996 | Nicholls ........... G06Q 10/06311 700/99 |
| 5,631,827 | A | | 5/1997 | Nicholls et al. |
| 7,117,170 | B1 | | 10/2006 | Bennett et al. |
| 7,966,369 | B1 | * | 6/2011 | Briere ................ G06Q 10/10 707/616 |
| 7,966,426 | B2 | * | 6/2011 | Smith ............... G06F 17/30578 707/610 |
| 8,032,409 | B1 | * | 10/2011 | Mikurak ............. G06Q 10/00 705/14.39 |
| 8,346,676 | B1 | | 1/2013 | Bennett et al. |
| 9,218,588 | B2 | | 12/2015 | Bennett et al. |
| 2002/0032573 | A1 | | 3/2002 | Williams et al. |
| 2002/0032612 | A1 | * | 3/2002 | Williams ............... G06Q 10/08 705/26.1 |
| 2002/0120555 | A1 | * | 8/2002 | Lerner ............... G06Q 30/0283 705/37 |
| 2002/0161674 | A1 | * | 10/2002 | Scheer ............... G06Q 10/0631 705/28 |
| 2004/0155960 | A1 | * | 8/2004 | Wren ....................... G07G 1/14 348/150 |
| 2005/0021409 | A1 | * | 1/2005 | Michaud, Jr. .......... G06Q 20/20 705/16 |
| 2005/0209876 | A1 | * | 9/2005 | Kennis ............. G06F 17/30569 726/1 |
| 2006/0010195 | A1 | * | 1/2006 | Mamou ................. G06Q 10/10 709/203 |
| 2006/0190544 | A1 | * | 8/2006 | Chikirivao ............ G06Q 10/06 709/206 |

OTHER PUBLICATIONS

Z-Firm Products—ShipRush SDK; 2005; pp. 1-2; http://www.ztirm.com/productsishiprush.sub.—sdk.shtml Applicant makes no admission that this reference constitutes prior art.

Notice of Allowance and Fees Due (PTOL-85) dated Jul. 29, 2015 for U.S. Appl. No. 11/154,866.

Non-Final Rejection dated Mar. 26, 2008 for U.S. Appl. No. 11/154,866.

Non-Final Rejection dated Dec. 7, 2010 for U.S. Appl. No. 11/154,866.

Non-Final Rejection dated Apr. 15, 2009 for U.S. Appl. No. 11/154,866.

iShip: Shipping Management for the the New Economy: An Internet-delivered solution; 2002; pp. 1-11 Applicant makes no admission that this reference constitutes prior art.

Final Rejection dated Sep. 16, 2008 for U.S. Appl. No. 11/154,866.
Final Rejection dated Oct. 7, 2009 for U.S. Appl. No. 11/154,866.
Final Rejection dated May 9, 2011 for U.S. Appl. No. 11/154,866.

* cited by examiner

DATA SYNCHRONIZATION FOR OFFLINE PROCESSING

CROSS REFERENCE TO RELATED APPLICATIONS

This application is a continuation of U.S. application Ser. No. 11/154,866 filed Jun. 15, 2005, which claims the benefit of U.S. Provisional Application No. 60/583,865, filed Jun. 29, 2004.

BACKGROUND

Field of the Invention

Embodiments of the present invention generally relates to computer systems and software and particularly relates to computer systems and software associated with the delivery of items such as parcels (a.k.a. "packages") that have been shipped by a shipper via a delivery service provider (hereinafter "service provider"), to an intended recipient (a.k.a. "consignee").

Description of Related Art

Presently, carrier management systems (CMS) allow users to ship packages through one or more carriers. CMS assist the user in choosing a carrier based on cost, efficiency or other defined characteristics. Typical users may be, for instance, corporations or business entities having shipping departments and retail shipping facilities such as Mail Boxes Etc./The UPS Store, Kinko's, Staples, etc. Generally, a typical shipping location will have one or more user terminals that access a CMS data center over a network. In typical CMS applications, rating data and other carrier specific information is generally maintained only at the CMS data center to facilitate updates/changes and minimize duplication.

A challenge faced by present CMS is the loss of communications between the data center and the user terminal. This may be caused by network outages and/or hardware or software problems at either the data center or the user terminal. Regardless of what the cause of the loss of communications, in many instances it may lead to the inability to pre-process, process and ship packages from the shipping location.

Therefore, systems and methods are needed to overcome the challenges present in the art, some of which have been described above.

BRIEF SUMMARY

One aspect of the invention is systems and methods of applying rates to packages for shipment with a carrier management system (CMS) wherein the CMS application is accessible at a local user's terminal that provides both offline and online capability. Online mode is when the user terminal has a connection with a data center over a network, and offline mode is when the user terminal is unable to connect or loses its connection with the data center over the network.

Another aspect of the invention is systems and methods of shipping packages utilizing a carrier management system (CMS) wherein the CMS application is accessible at a local user's terminal that provides both offline and online capability. Online mode is when the user terminal has a connection with a data center over a network, and offline mode is when the user terminal is unable to connect or loses its connection with the data center over the network.

Another aspect of the invention is systems and methods of applying rates to packages for shipment and shipping said packages with a carrier management system (CMS) wherein the CMS application is accessible at a local user's terminal that provides both offline and online capability. The user terminal is located at a shipping facility such as, for example, a Mail Boxes Etc./UPS Store, Kinko's, etc. Online is defined as said user terminal having a connection with a data center over a network, and offline is defined as the user terminal unable to connect with the data center over the network.

Yet another aspect of the invention is systems and methods of storing carrier rating data, including custom contract and retail rates, locally at a shipping location as well as on centralized data center servers. The locally-stored rating data allows the shipping location to process packages when communication with the data servers is unavailable. The locally-stored rating is synchronized automatically with the centrally-stored rating data when the communication with the data center is restored, thereby allowing centralized maintenance of carrier rating data.

Another aspect of the invention is systems and methods of creating carrier package tracking information locally at a shipping location for shipping packages with a carrier management system (CMS) while said shipping station is unable to connect with a CMS data center. The locally-stored package tracking information is synchronized automatically with the data center when the shipping location is able to connect to the data center, thereby allowing centralized tracking of packages.

Another aspect of the invention is systems and methods of creating carrier shipping, traveler and receipt labels locally at a shipping location for shipping packages with a carrier management system (CMS) while said shipping location is unable to connect with a CMS data center. The locally-stored package label information is synchronized automatically with the data center when the shipping location is able to connect to the data center.

Another aspect of the invention is systems and methods of universal logon for a user of a carrier management system (CMS) application that at least in part resides on a local user terminal. The user logs on to the CMS application through the local user terminal using logon credentials established while the user terminal is connected with a CMS data center. The CMS application automatically detects a connection state between the user terminal and the CMS data center and sends the user to an offline mode when the user terminal is unable to detect a connection between the user terminal and the CMS data center. In the offline mode some features of the CMS application are deactivated, however, the user is still able to pre-process, process and ship packages in the offline mode.

Another aspect of the invention is systems and methods of a guest mode user logon for a user of a carrier management system (CMS) application that at least in part resides on a local user terminal. The guest mode allows the user to logon to the CMS application through the local user terminal when the user's logon credentials are not known or recognized by the CMS application. In guest mode some features of the CMS application are deactivated and the guest mode allows the user to enter package shipping data that is stored for later retrieval and processing.

Yet another aspect of the invention is systems and methods of locking out access to a carrier management system (CMS) application that at least in part resides on a local user terminal after said user terminal is unable to connect to a CMS data center for a predetermined amount of time (a lockout mode). The lockout mode helps ensure that a user of the user terminal is provided with current service offerings and rates of the CMS application.

Another aspect of the invention is the systems and methods of the above described lockout mode, wherein an unlock key allows access to use of the CMS application at the locked user terminal when access is required.

Another aspect of the invention is a carrier management system (CMS) capable of operating from a user terminal while said user terminal is connected (online) to or disconnected (offline) from a CMS data center. The CMS application integrates online and offline modes by automatically detecting the connection state of the user terminal and automatically synchronizing package data when the user terminal is online, which thereby allows local processing of packages while maintaining the advantages of central storage of shipping information.

Another aspect of the invention is a carrier management system (CMS) capable of operating from a shipping location while the shipping location is connected (online) to or disconnected (offline) from a CMS data center. The CMS application maintains user privileges and preferences that are created online while offline and allows enterprise level maintenance of privileges via a web based administrator while still allowing offline processing for business continuance.

Yet another aspect of the invention is a carrier management system (CMS) capable of operating from a shipping location while the shipping location is connected (online) to or disconnected (offline) from a CMS data center. The CMS application automatically disables any unsupported features while offline and automatically displays available service levels (e.g. FedEx shows no shipping label on the rate list).

These, and other aspects of the invention are described in greater detail in the drawings and description herein.

BRIEF DESCRIPTION OF THE SEVERAL VIEWS OF THE DRAWINGS

Figure 1:
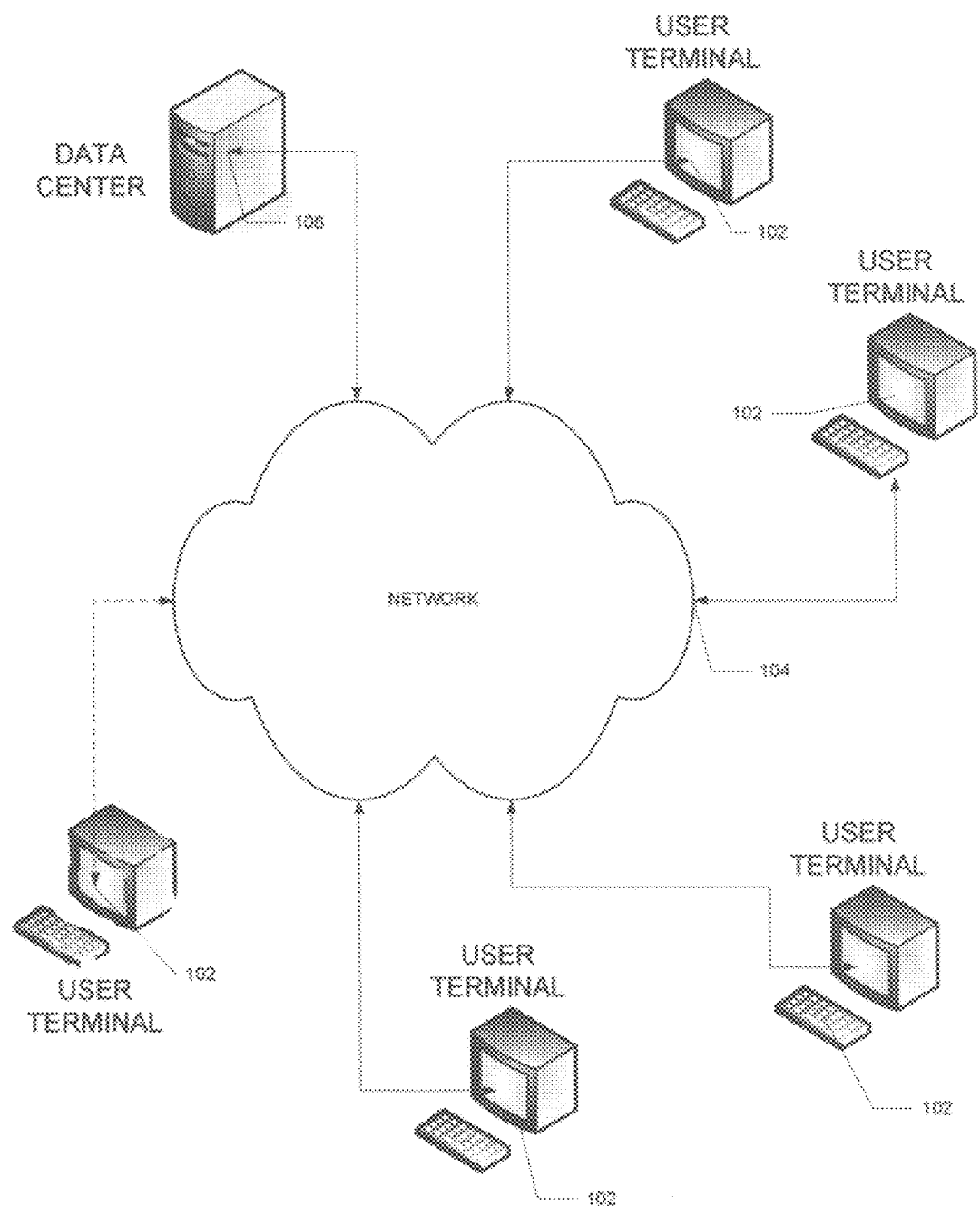
Figure 2:
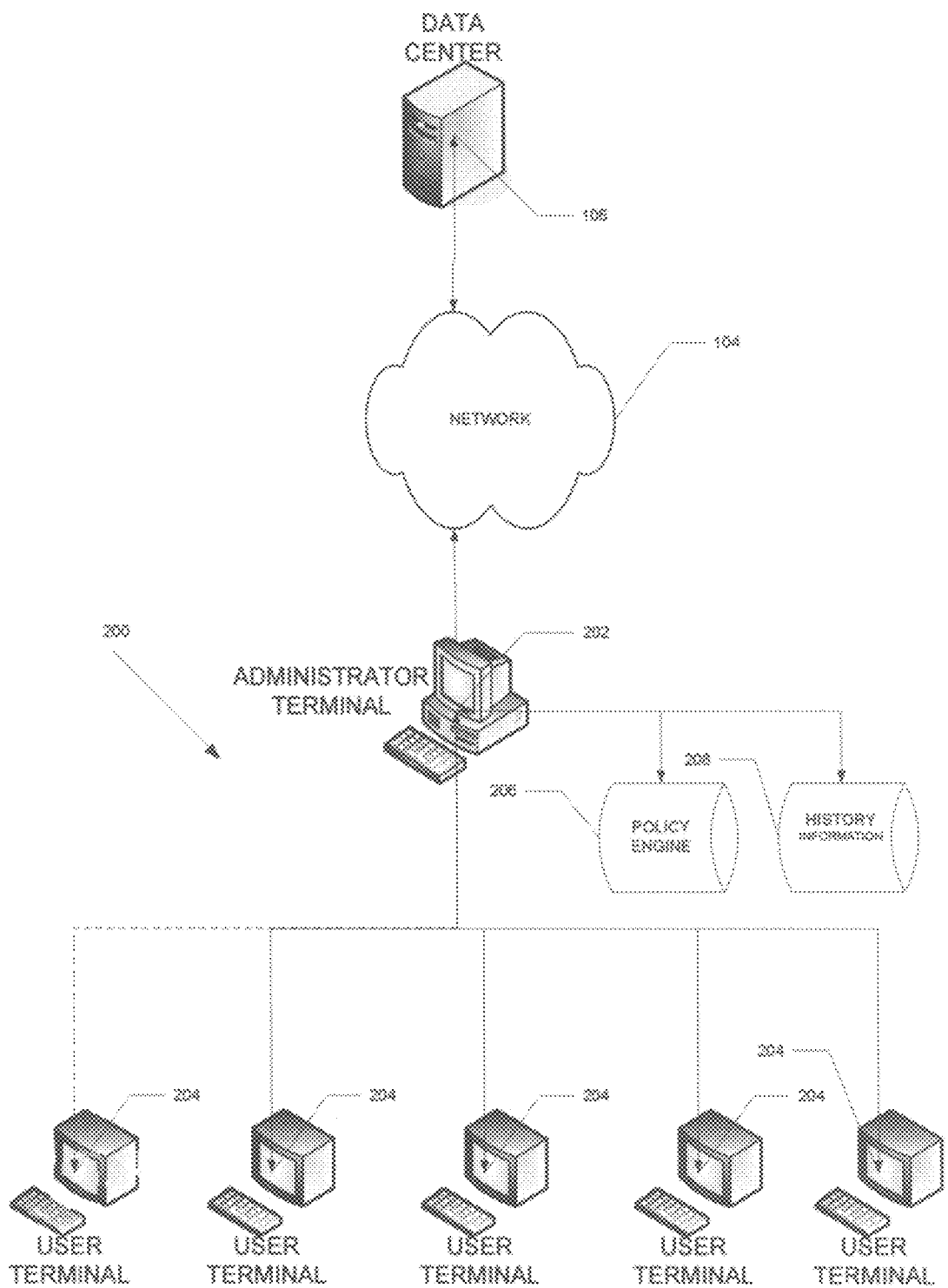
Figure 2A:
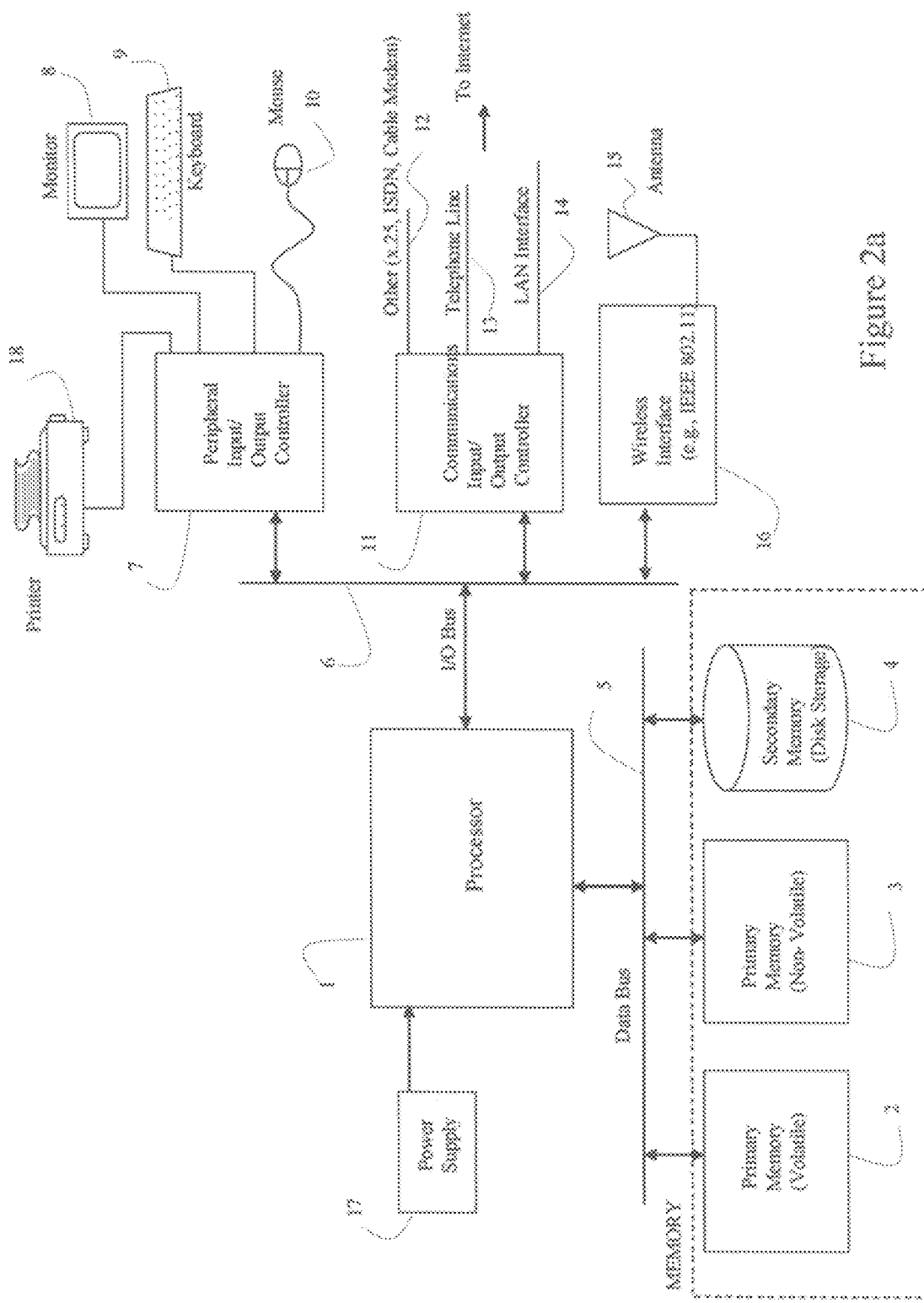
Figure 2B:
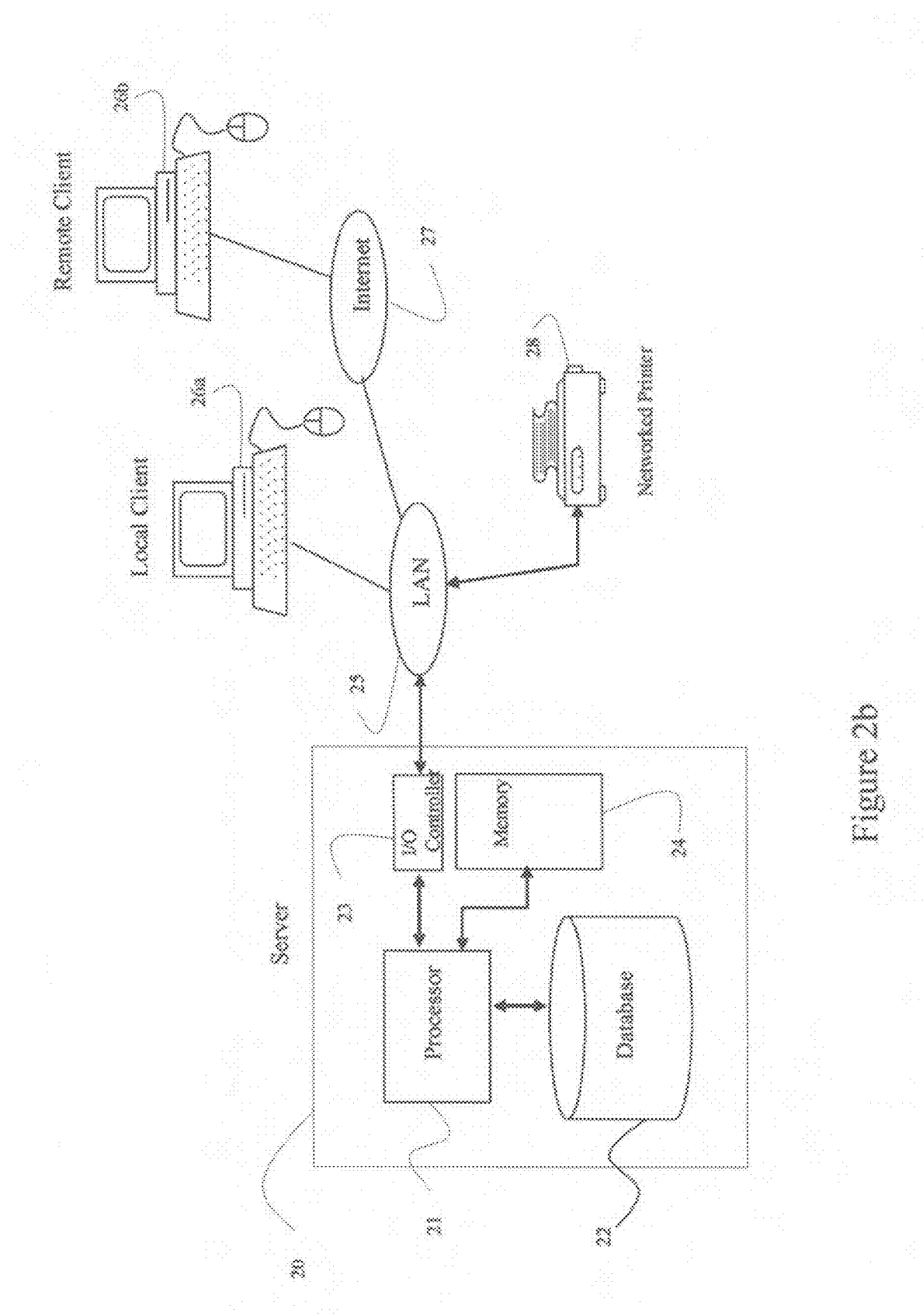
Figure 3:
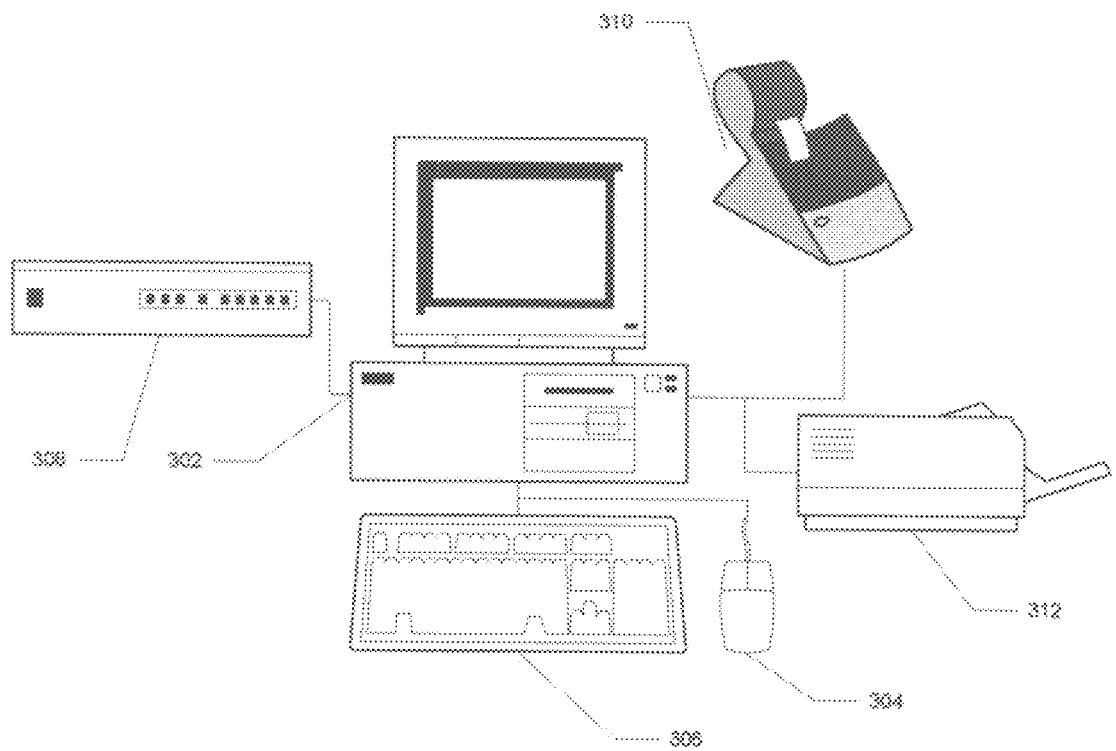
Figure 4A:
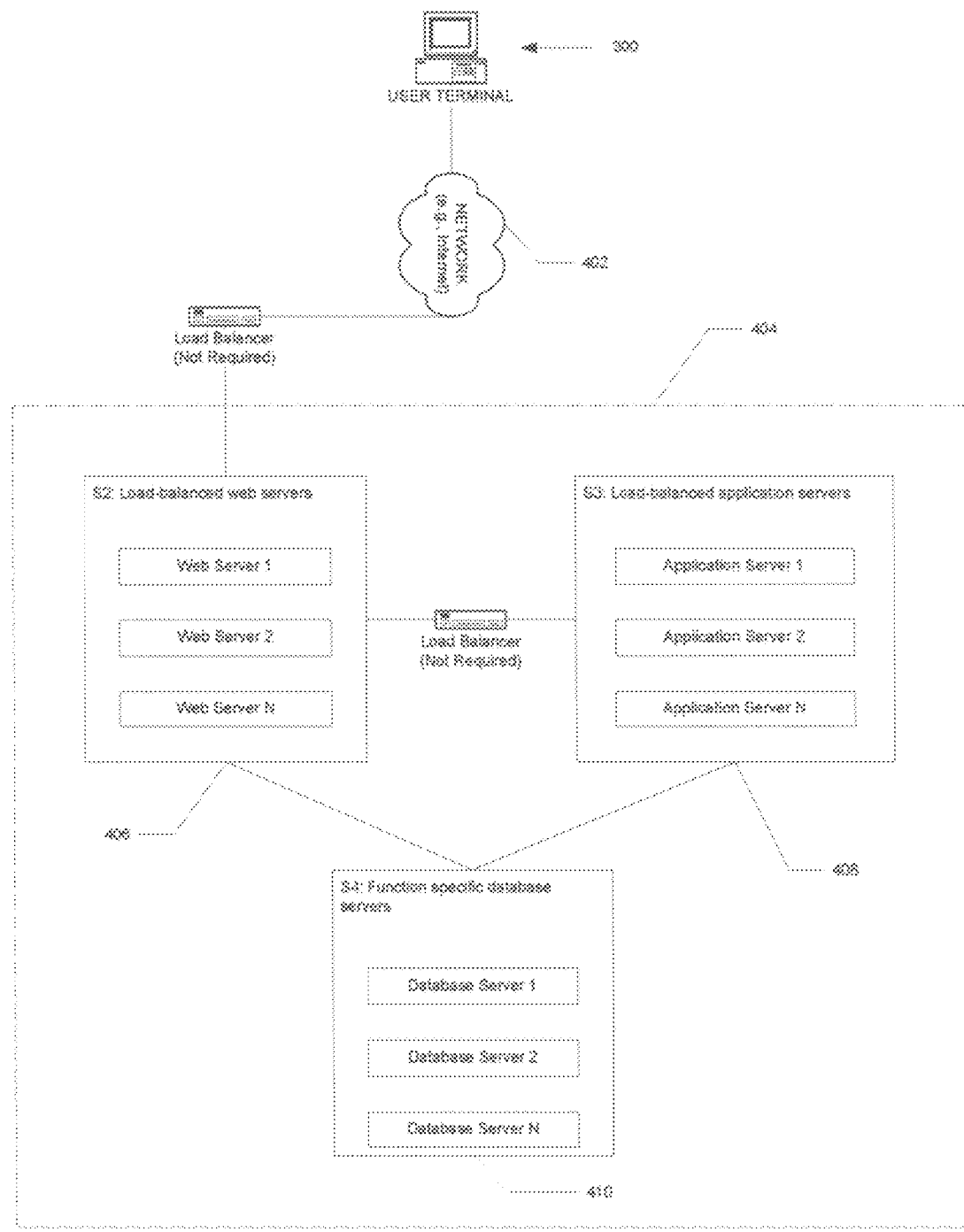
Figure 4B:
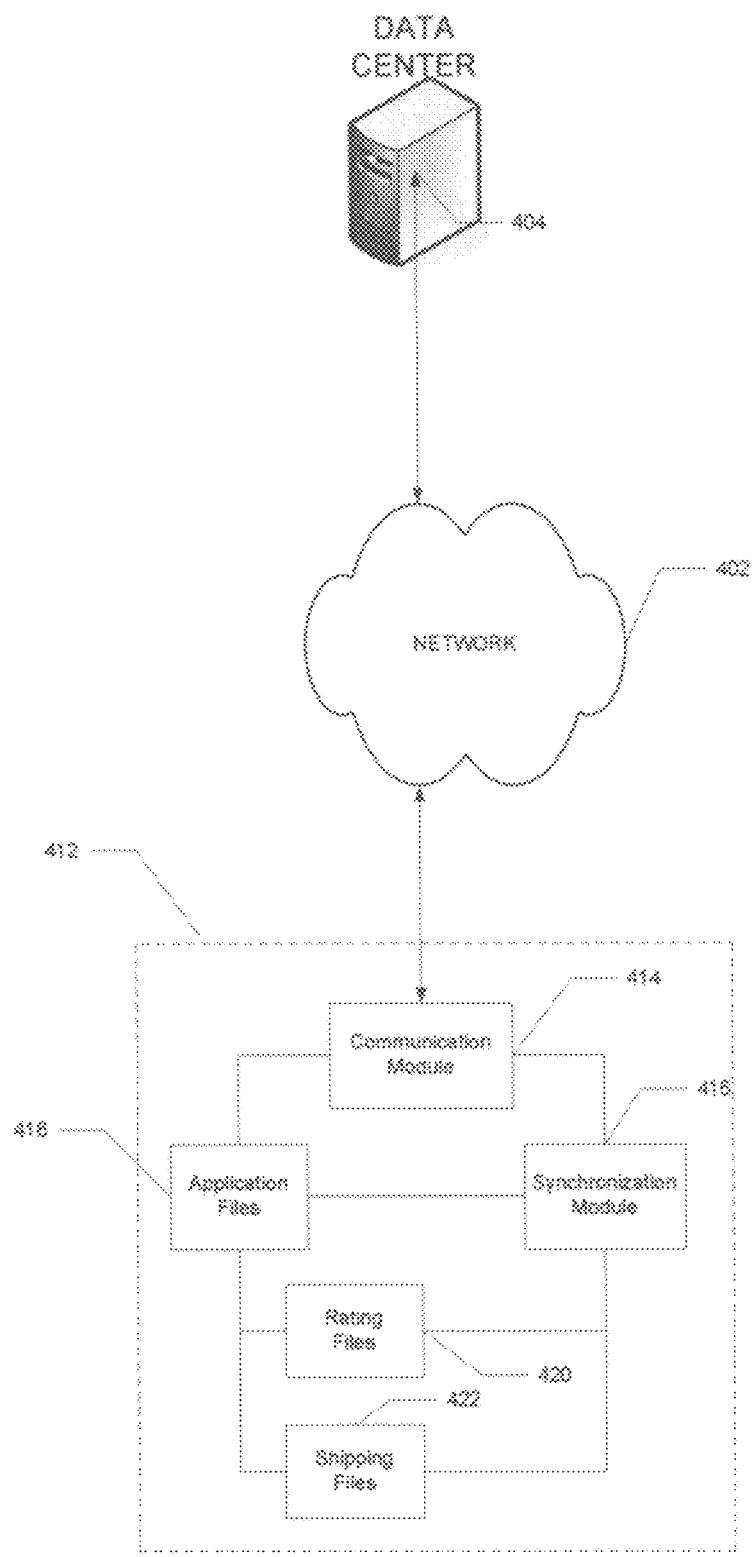
Figure 5A:
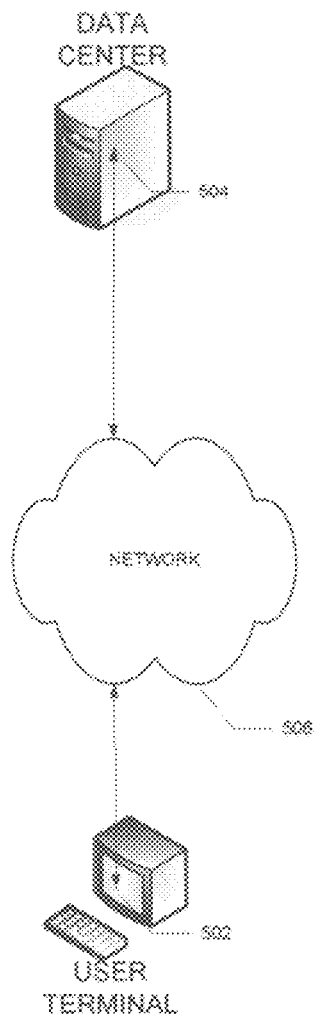
Figure 5B:
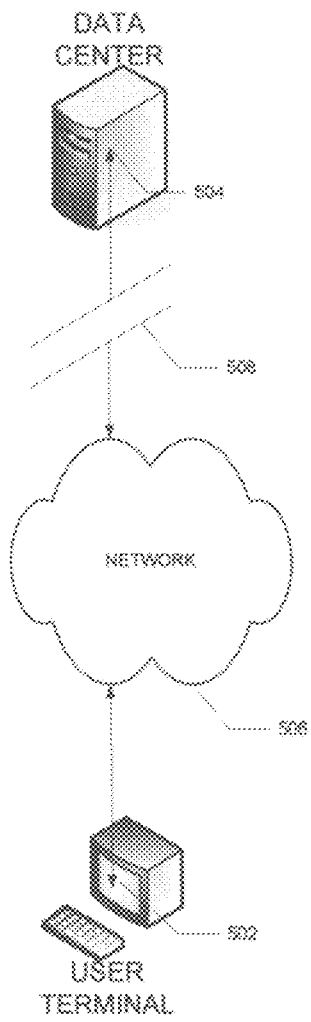
Figure 5C:
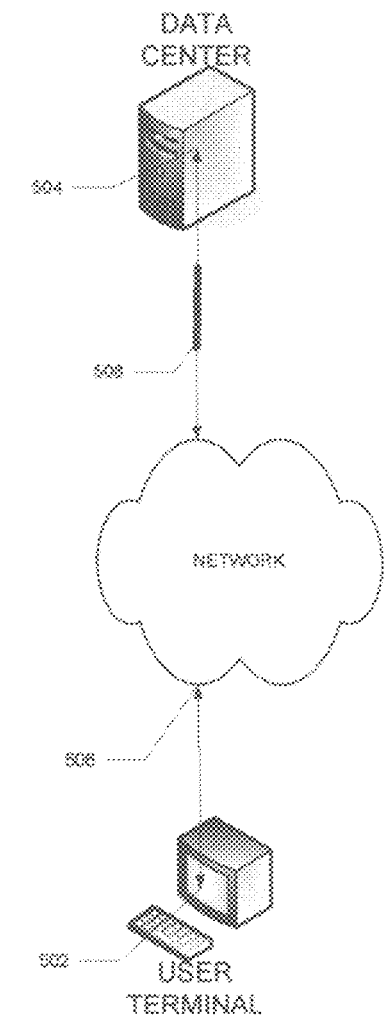
Figure 6:
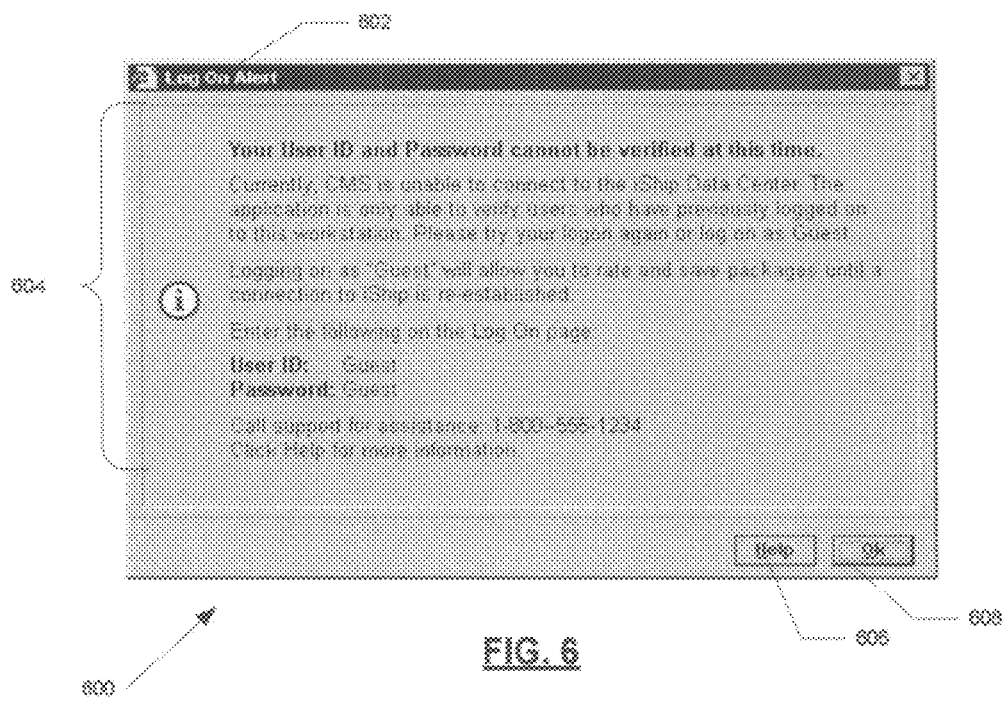
Figure 7A:
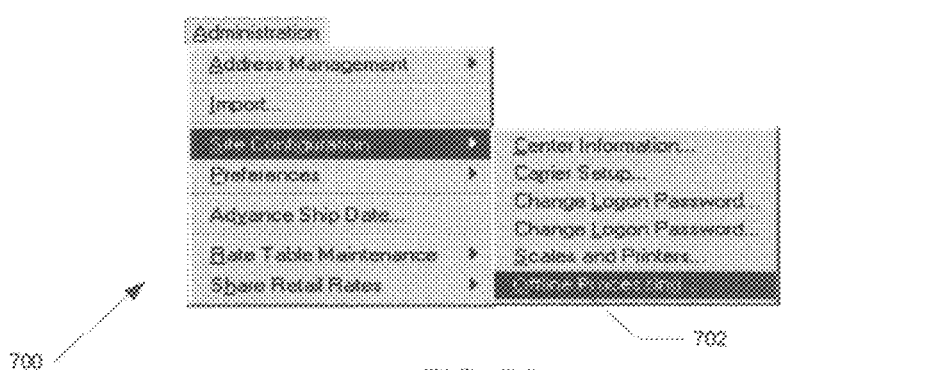
Figure 7B:
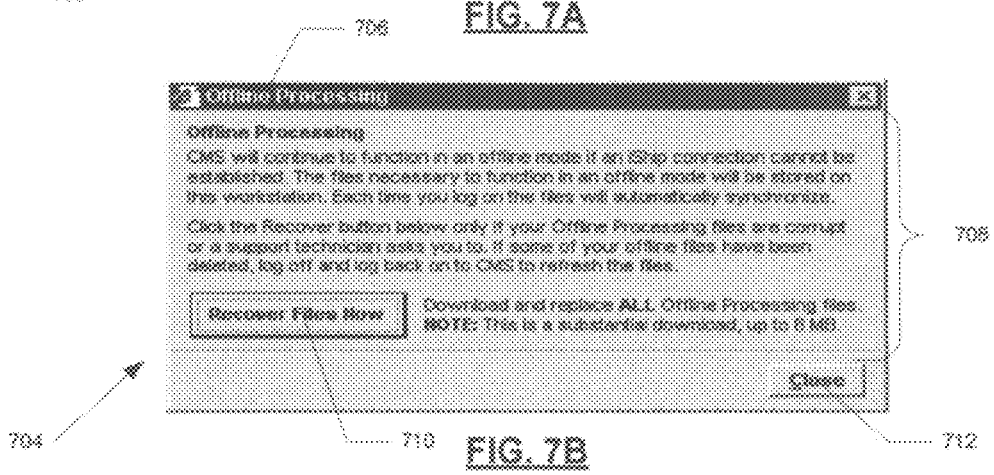
Figure 7C:
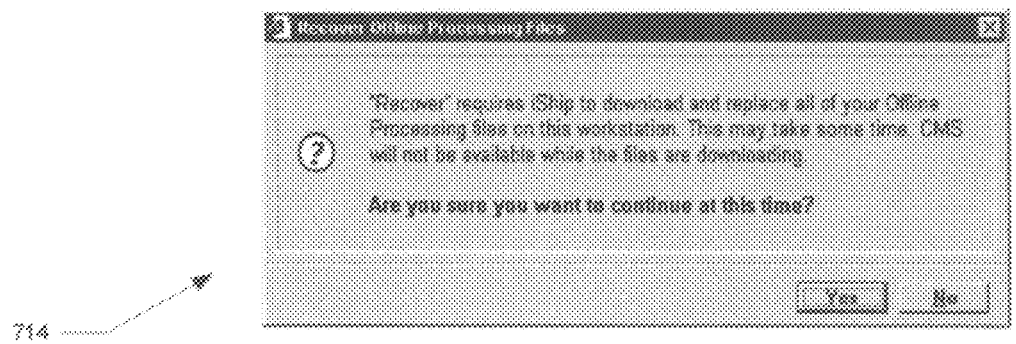
Figure 7D:
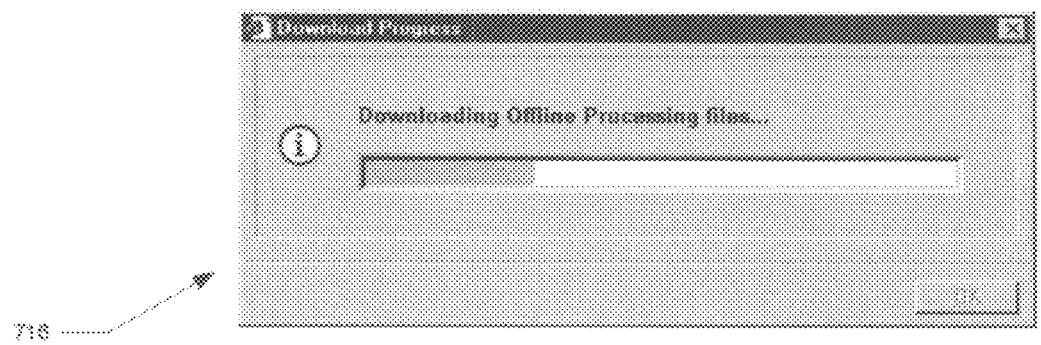
Figure 7E:
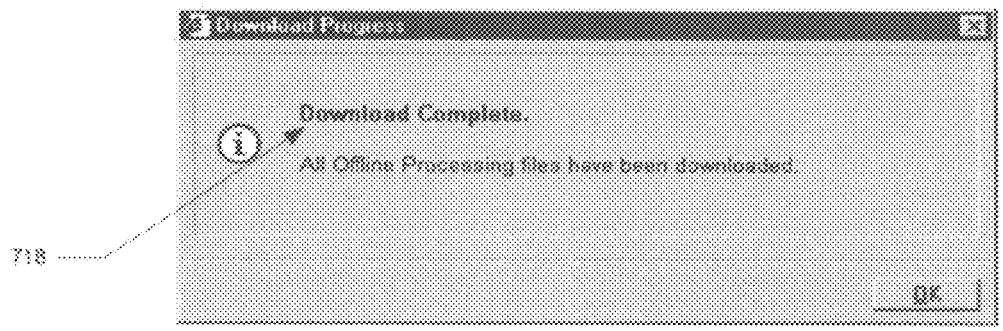
Figure 8:
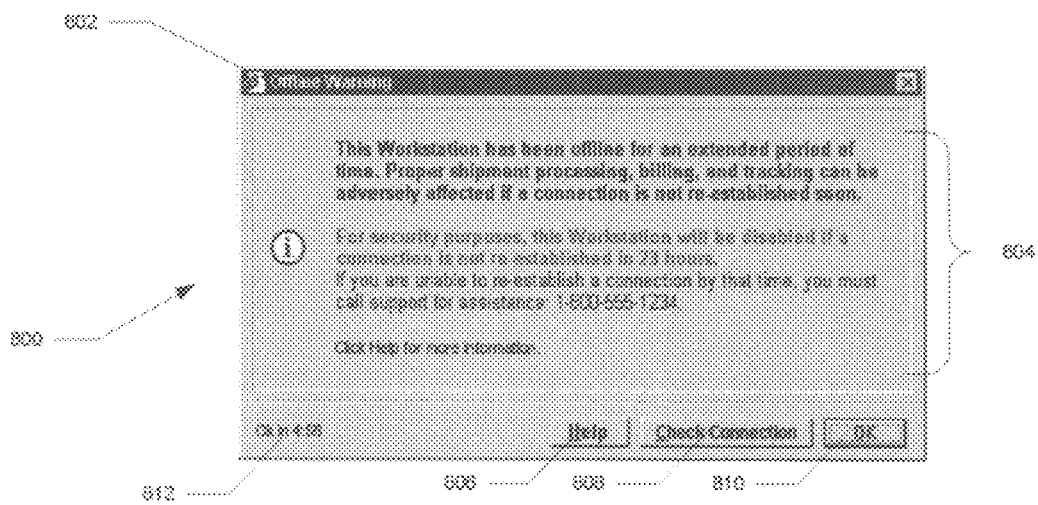
Figure 9:
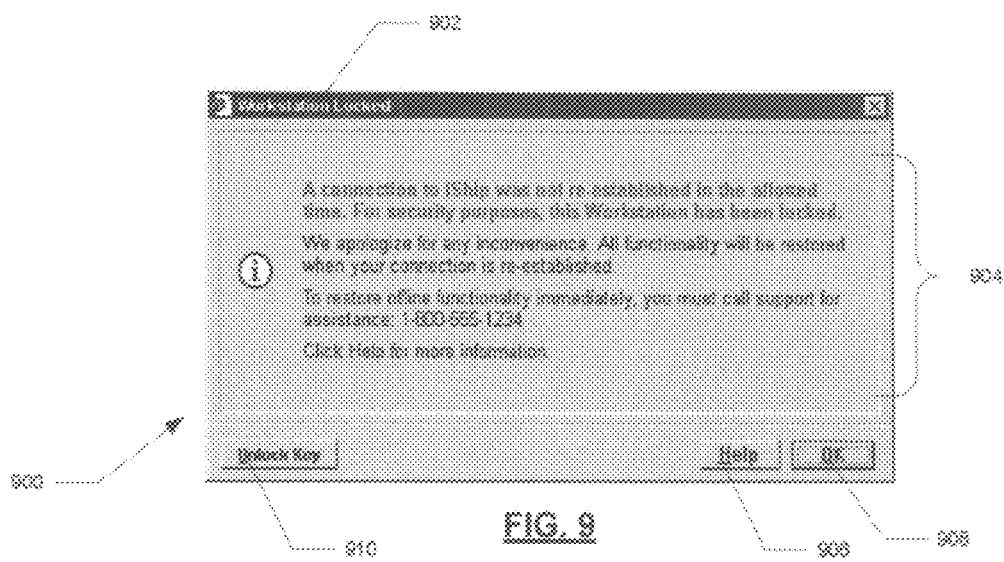
Figure 10:
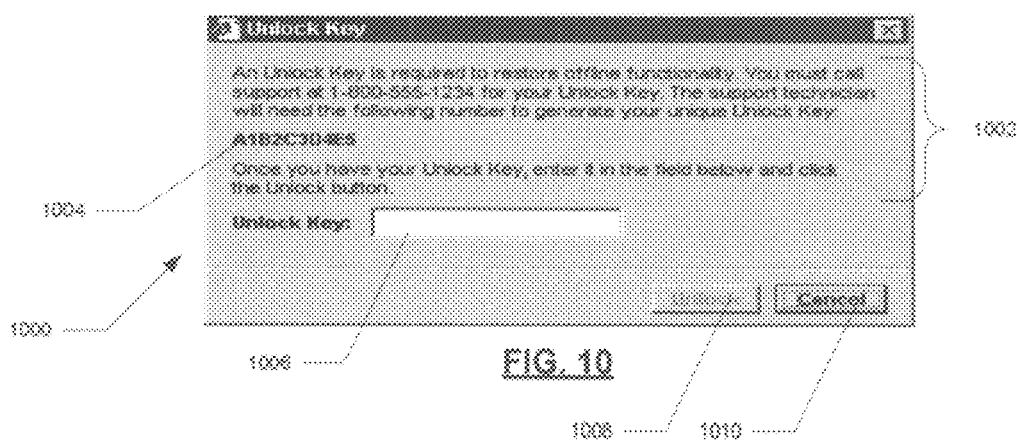
Figure 11:
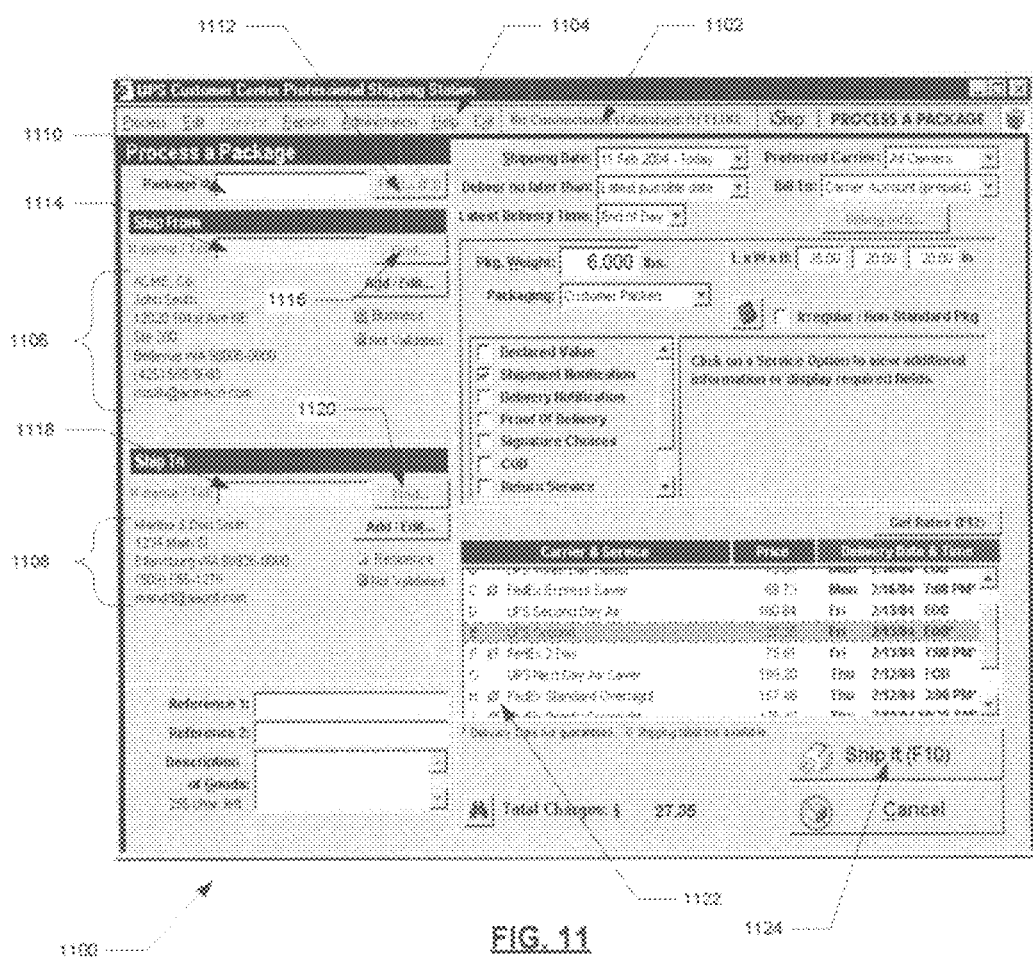
Figure 12:
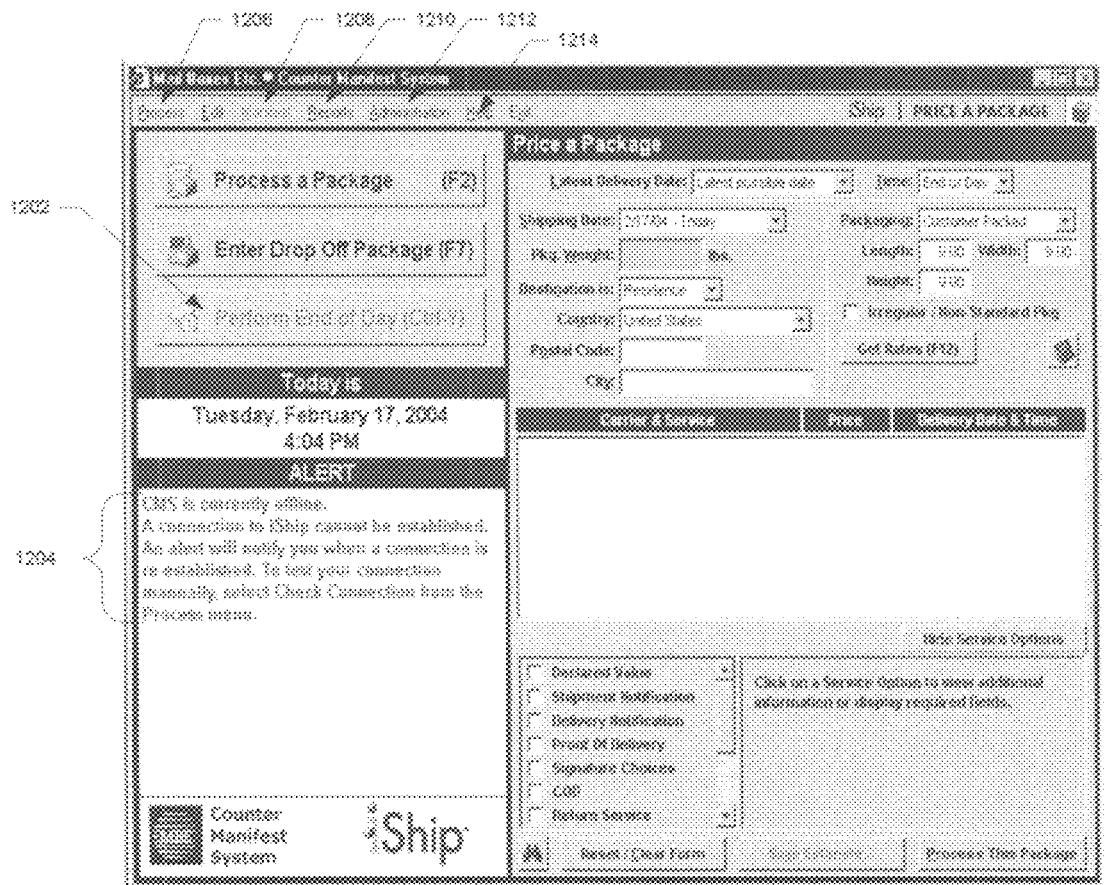
Figure 13:
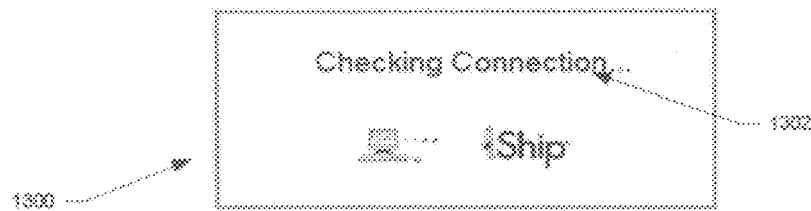
Figure 14:
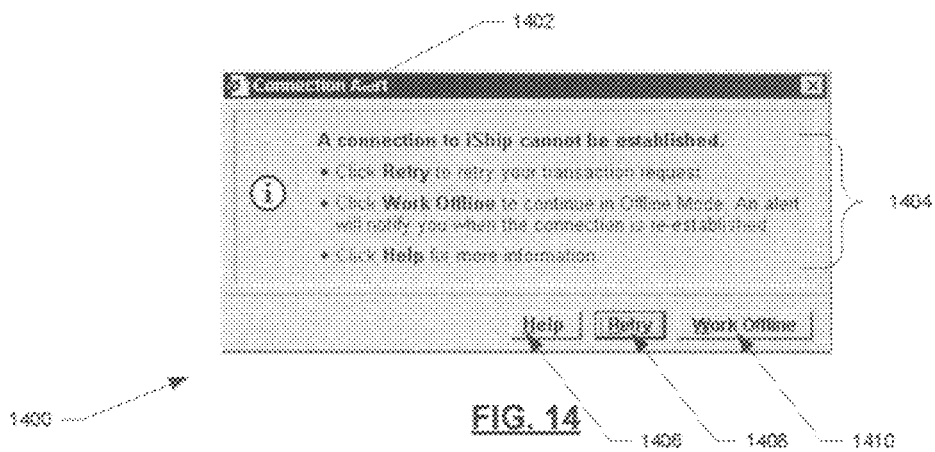
Figure 15:
Figure 15:
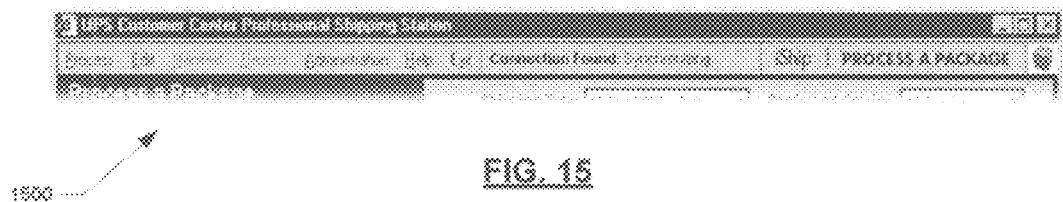
Figure 16:
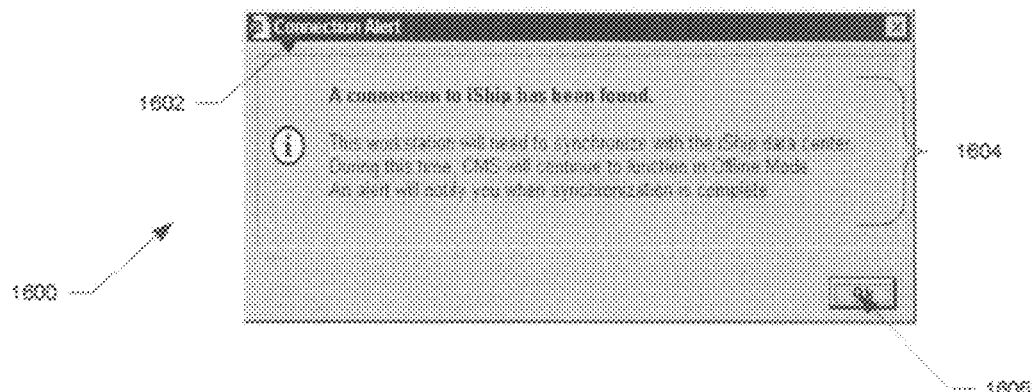
Figure 17A:
Figure 17B:
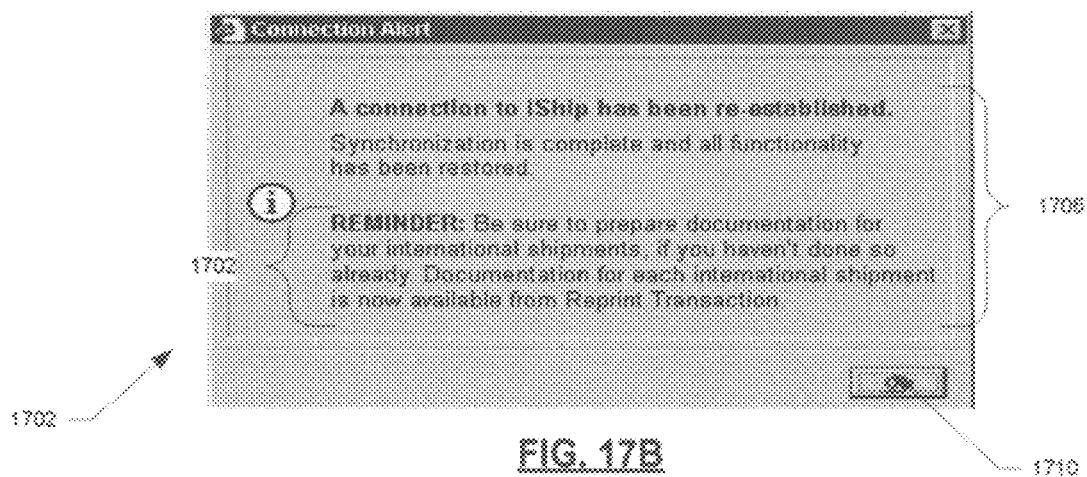
Figure 18:
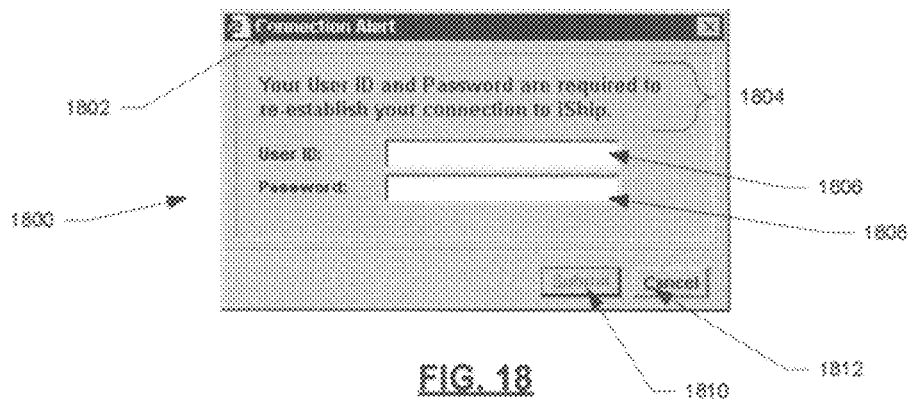
Figure 19:
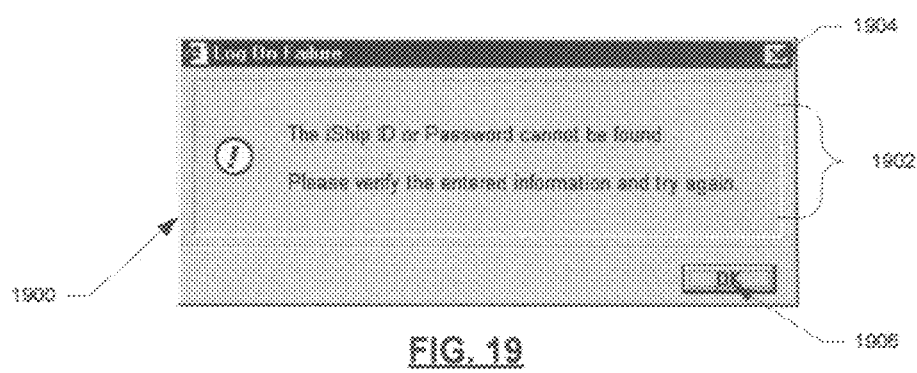
Figure 20:
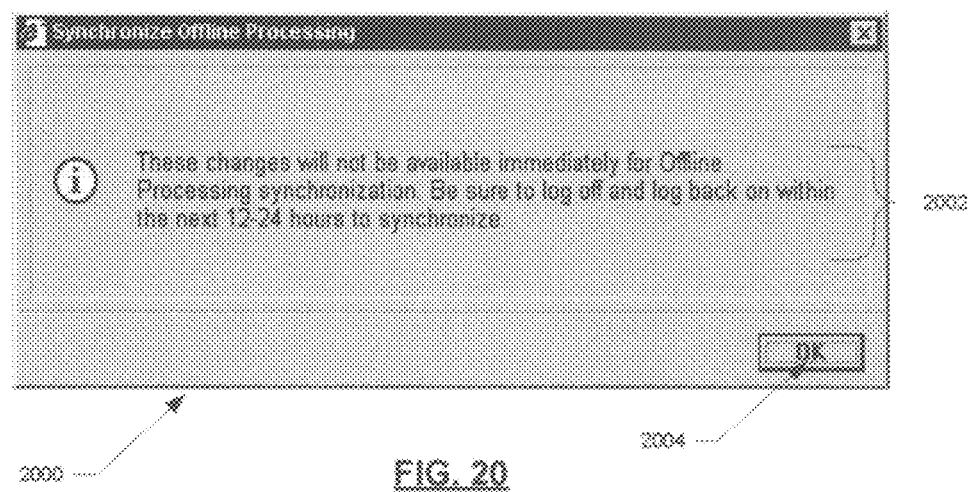
Figures 21A, 21B:
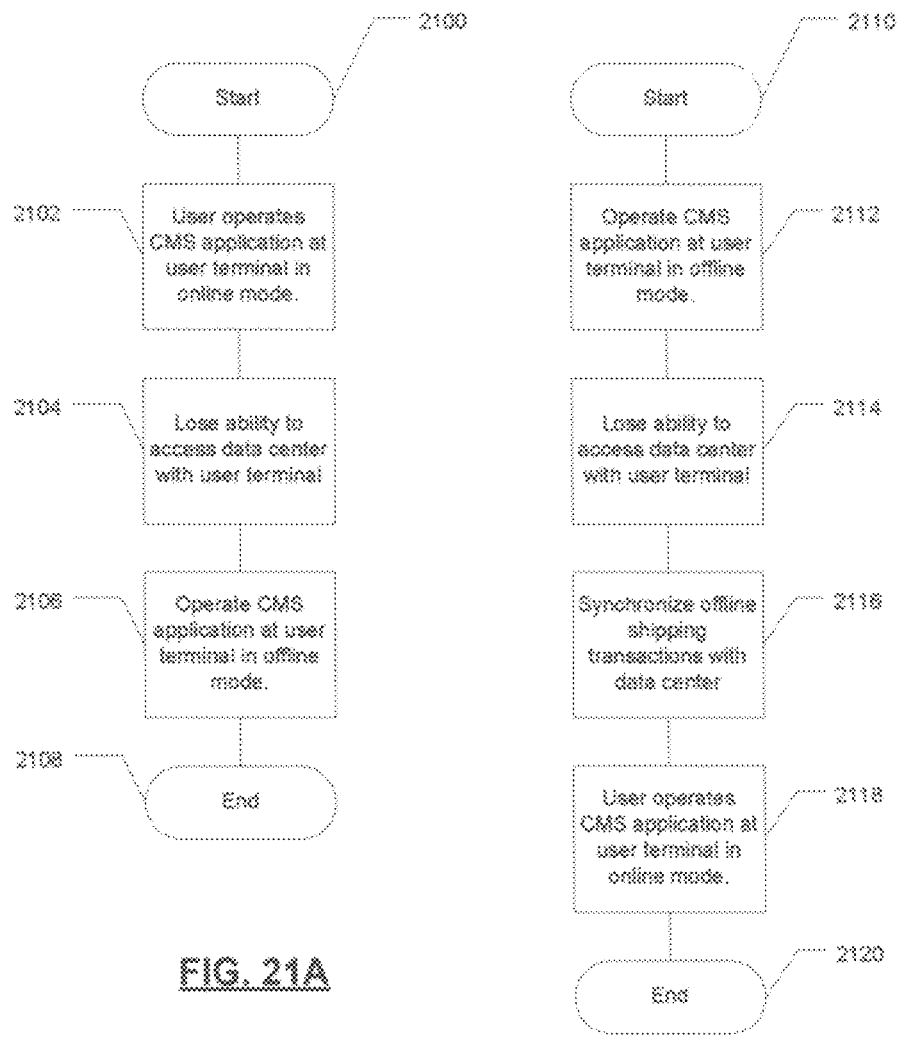

Having thus described the invention in general terms, reference will now be made to the accompanying drawings, which are not necessarily drawn to scale, and wherein:

FIG. 1 is an illustration of an exemplary carrier management system that may be utilized to practice aspects of the present invention;

FIG. 2 is an illustration of an exemplary shipping location comprised of an administrator's station and one or more shipping stations, that may be utilized to practice aspects of the present invention;

FIG. 2a is an illustration of one embodiment of a computer that can be used to practice aspects of the present invention;

FIG. 2b is an embodiment of a processing system having a distributed communication and processing architecture that may be used to practice aspects of the present invention;

FIG. 3 is an illustration of a typical user terminal that may be used in one or more embodiments of the present invention;

FIG. 4A is an illustration of a user terminal such as that shown in FIG. 3, which may be connected over a network to a data center, wherein the data center is comprised of one or more web servers, one or more application servers, and one or more database servers, in an embodiment of the invention;

FIG. 4B is an illustration of an embodiment of a user terminal, which may be connected over a network to a data center, wherein the user terminal is comprised of at least a communication module, a synchronization module, application files, rating files and shipping files, in an embodiment of the invention;

FIG. 5A is an illustration of a CMS operating in its normal online mode with a user terminal having a connection to a data center over a network in an embodiment of the invention;

FIG. 5B is an illustration of a loss of a network connection between a user terminal and a data center of a CMS while the user terminal is able to continue to process and ship packages in an embodiment of the invention;

FIG. 5C is an illustration of an embodiment of the invention where the network connection between the user terminal and the data center is restored and the data stored on the user terminal for packages shipped while the user terminal was offline is synchronized with the data center;

FIG. 6 is an exemplary logon alert dialogue box that may be used in an embodiment of the invention;

FIG. 7A is an exemplary illustration of an "Offline Processing" menu item that may be added to a Site Configuration menu of a CMS application in an embodiment of the invention;

FIG. 7B is an exemplary illustration of an offline processing panel that is opened and displayed at the user terminal in an embodiment of the invention;

FIG. 7C is an exemplary pop-up panel that is displayed at the user terminal when the "Recover" button of FIG. 5B is selected;

FIG. 7D is an exemplary download progress dialog box that is displayed at a user terminal when replacing offline processing files in a recovery process, in an embodiment of the invention;

FIG. 7E is an exemplary download progress dialog box that is displayed at a user terminal when the offline processing files in a recovery process have been downloaded to the user terminal, in an embodiment of the invention;

FIG. 8 is an exemplary Offline Expiration Warning dialog that is displayed at a user terminal when a user terminal has been operating an in offline mode for an extended period of time;

FIG. 9 is an exemplary locked dialog that is displayed at a user terminal when the countdown reaches zero for a user terminal that has been offline indicating that the CMS application has been disabled, in an embodiment of the invention;

FIG. 10 is an exemplary unlock key dialog that is displayed at the user terminal when an unlock key button is selected on the locked dialog of FIG. 16, the Unlock Key dialog is used to determine the initial value needed to generate the unlock key for the user terminal, in an embodiment of the invention;

FIG. 11 is an exemplary illustration of a screen for processing a package in a typical CMS application, wherein the CMS application is operating in offline mode in an embodiment of the invention;

FIG. 12 is an exemplary illustration of a screen displayed on a user terminal for pricing a package in a typical CMS application, wherein the CMS application is operating in offline mode, in an embodiment of the invention;

FIG. 13 is an exemplary Check Connection Status panel that is displayed at a user terminal when a "Connection Check" function is selected, wherein a search for a connection between the user terminal operating the CMS application and a data center servers occurs, in an embodiment of the invention;

FIG. 14 is an exemplary "Lost Connection" alert that is displayed at a user terminal when a user attempts to logon to a CMS application in online mode and a connection from the user terminal to the data center cannot be established or a connection to the data center is lost while logged on to the CMS application;

FIG. 15 is an exemplary Connection Found Initializing/Synchronizing alert that is displayed at a user terminal when a connection from the user terminal to the data center is found after such connection had been lost, in an embodiment of the invention;

FIG. 16 is an exemplary "Manual Connection Found" alert that is displayed on a user terminal when a manual connection check is requested and a connection between the user terminal and the data center is found, in an embodiment of the invention;

FIG. 17A is an exemplary "Connection Re-established" alert that is displayed at a user terminal when a connection between a user terminal and the data center is re-established, in an embodiment of the invention;

FIG. 17B as an alternative exemplary "Connection Re-established" alert that is displayed at a user terminal if information about an international package that was prepared for shipment while the user terminal was offline is found in the locally stored user terminal package information, in an embodiment of the invention;

FIG. 18 is an exemplary mini logon dialog alert (a re-validation alert) that is displayed at a user terminal when a User ID and password are to be entered when a connection between the user terminal and a data center is to be re-established and the logon credentials used to logon to the CMS application in the offline mode do not match the credentials stored on the data center once a connection has been re-established, in an embodiment of the invention;

FIG. 19 is an exemplary Logon Failure alert that is displayed at the user terminal if validation of logon credentials fails, in an embodiment of the invention;

FIG. 20 is an exemplary synchronize alert that is displayed at the user terminal when each of the following occur: rates are modified while online; Offline Processing is "On" for the account; or the Close button on the Modify Rates dialog is clicked, in an embodiment of the invention;

FIG. 21A is a flowchart of a process for processing packages when a user terminal loses its ability to access a data center in an embodiment of the invention.

FIG. 21B is a flowchart of a process for synchronizing a user terminal that is processing packages in the offline mode with a data center once the ability of the user terminal to access the data center is restored, in an embodiment of the invention.

Figure 22:
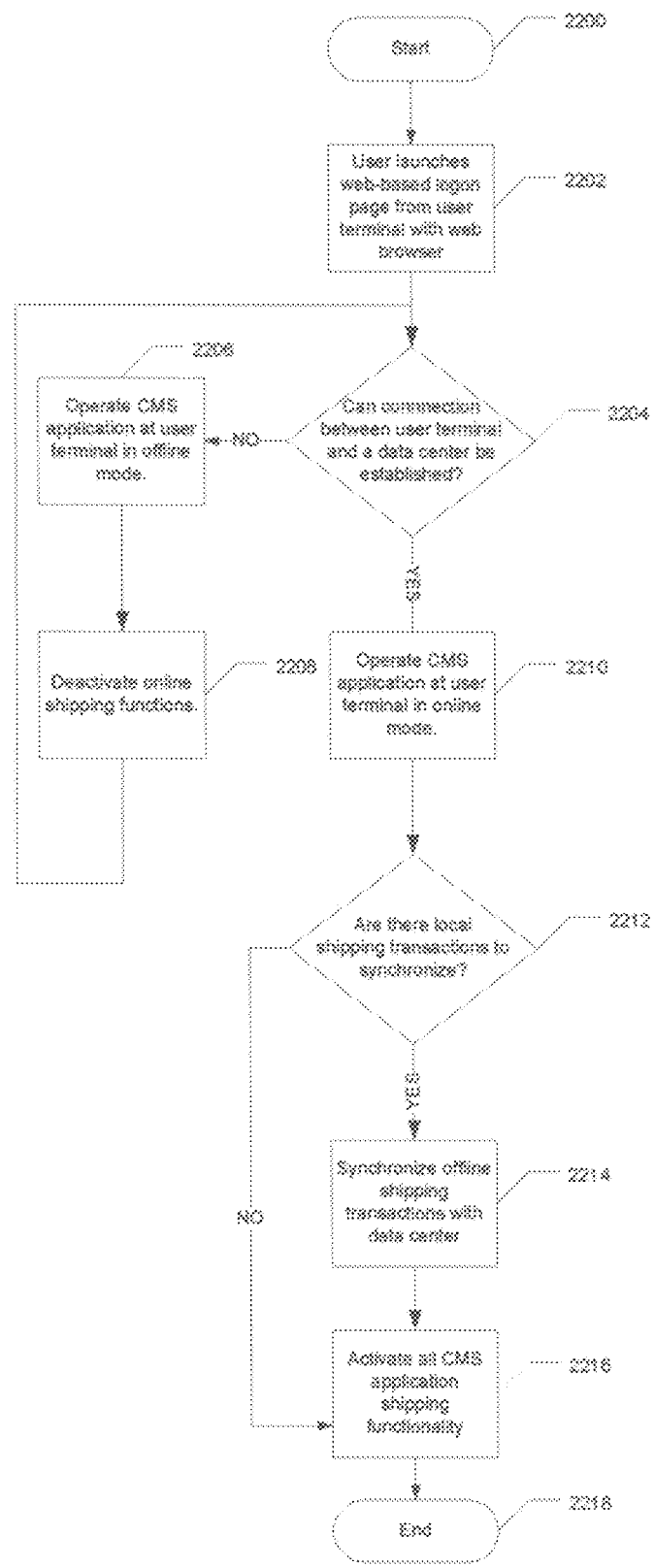
Figure 23:
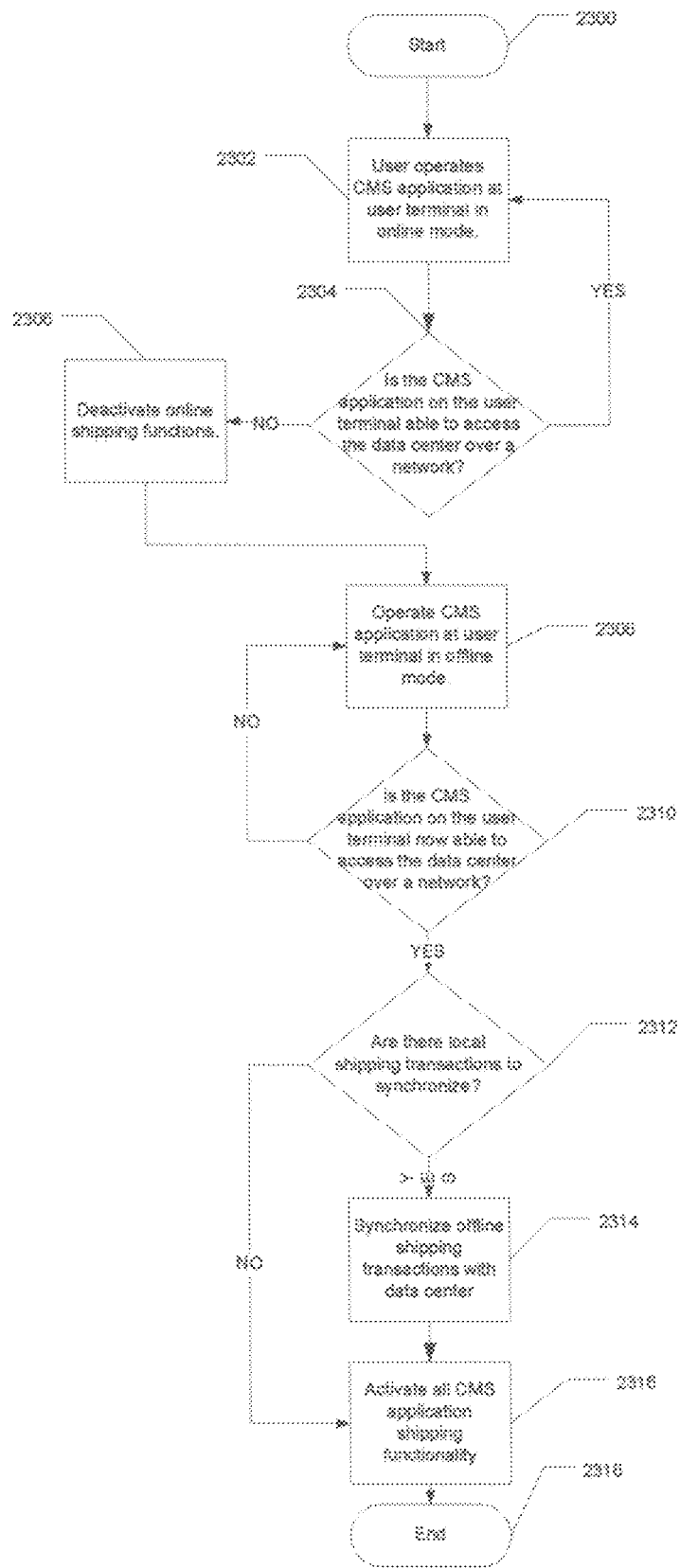

FIG. 22 is a flowchart of a process of offline processing for packages utilizing a CMS application in an embodiment of the invention; and FIG. 23 is a flowchart of a process of offline processing for packages utilizing a CMS application in an embodiment of the invention.

DETAILED DESCRIPTION

Embodiments of the present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers, if referenced herein, refer to like elements throughout.

Embodiments of the present invention is described below with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Various entities provide carrier management systems for shipping parcels. Carrier management systems are generally network-delivered, multi-carrier shipping management systems that allow rate/service comparisons of various carriers, generate mailing/shipping labels and collect and arrange data. Although there are several different configurations and operating mechanisms for these systems, a basic configuration is shown in FIG. 1, which generally consists of one or more user terminals 102 or shipping stations (generally clients) that are connected over a network 104 to one or more servers that function as a data center 106. Generally, a user terminal 102 utilizes browser-based software to access a data center 106 over the Internet. The data center 106 contains rating and/or shipping information for one or more carriers. However, software other than browsers and networks other than the Internet may be used in the embodiments of this invention.

A user at a user terminal 102 may enter certain information about a parcel to be shipped such as, for example, the parcels weight, dimensions, destination, shipper, desired class of service (ground, overnight air, etc.), etc. Furthermore, certain business rules of the entity operating or controlling the user terminal 102 may be applied. Information may be entered into the user terminal 102 in a multitude of ways such as, for example, by the use of scales, scanners, keyboards, etc. Once some amount of information has been received by the user terminal 102, the user terminal 102 will access the data center 106 over the network 104 for rating information and shipping information for various carriers that are participating in the carrier management system. This rating and shipping information will then be presented to a shipper and the shipper may decide which carrier to use based on the presented information. In this manner the shipper may be presented with various carrier options for shipping the parcel and may choose the one that best meets the shipper's needs and/or budget.

A shipping location 200 may be comprised of one or more user terminals. For instance, a shipping location as shown in FIG. 2 may be comprised of an administrator's station 202 and one or more shipping stations 204. While the administrator station 202 and the shipping stations 204 may serve as user terminals for conducting shipping business, the administrator station manages 204 shipping activities across the shipping location (a/k/a enterprise). For instance, the administrator station 204 may contain, in some embodiments, a policy engine 206 that can specify business rules and procedures for all shipping stations associated with the enterprise. In the process of entering and shipping information and printing labels, the policy engine 206 can automatically create compliance with key policies and track compliance with the enterprise's business rules. The administrator station 202 may also be used to collect a history of the enterprise's shipping transactions. This history information 208 may be used create a number of shipping reports, including shipping activity by location, shipping activity by carrier, shipping activity by department, shipping activity by cost center, etc.

Various carrier management systems have been patented or have patent applications pending. For instance, U.S. Pat. No. 5,631,827; issued to Nicholls et al. on May 20, 1997 and U.S. Pat. No. 5,485,369 issued to Nicholls et al. on Jan. 16, 1996; both fully incorporated herein and made a part hereof, describe one such carrier management system. Another such carrier management system is described in U.S. patent application Ser. No. 09/684,869; filed on Oct. 6, 2000; U.S. patent application Ser. No. 09/684,865 also filed on Oct. 6, 2000; and U.S. patent application Ser. No. 09/820,377 filed on Mar. 27, 2001 and published as United States Patent Application Publication No. 20020032573 on Mar. 14, 2002; each fully incorporated herein and made a part hereof.

Because of the architecture of these carrier management systems, a user terminal may be unable to operate or susceptible to failure and outages in the event that a connection with the data center is not obtained, lost or impeded. In some instances, the shipper may be precluded from processing and/or shipping parcels at a user terminal when the network connection with the data center is not obtained, lost or impeded. The embodiments of the present invention overcome the challenges caused when the user terminal is unable to connect, loses its connection or has an impeded connection with the data center.

In several of the embodiments of the invention referenced herein, a "computer" or user station is referenced. The computer or user station may be, for example, a mainframe, desktop, notebook or laptop, hand-held, hand held device such as a data acquisition and storage device, etc. In some instances the computer may be a "dumb" terminal used to access data or processors over a network. Turning to FIG. 2a, one embodiment of a computer is illustrated that can be used to practice aspects of the present invention. In FIG. 2a, a processor 1, such as a microprocessor, is used to execute software instructions for carrying out the defined steps. The processor receives power from a power supply 17 that also provide power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities.

Finally, the processor 1 may communicate with a wireless interface 16 that is operatively connected to an antenna 15 for communicating wirelessly with another devices, using for example, one of the IEEE 802.11 protocols, 802.15.4 protocol, or a standard 3G wireless telecommunications protocols, such as CDMA2000 1×EV-DO, GPRS, W-CDMA, or other protocol.

An alternative embodiment of a processing system that may be used is shown in FIG. 2b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to the Internet 27. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible and can be used to practice the principles of the present invention. The embodiments illustrated in FIGS. 2a and 2b can be modified in different ways and be within the scope of embodiments of the present invention as claimed.

A typical user terminal that may be used in one or more embodiments of the present invention is shown in FIG. 3. The embodiment of a user terminal 300 of FIG. 3 is comprised of a personal computer 302 having a mouse 304 and a keyboard 306. Also included in this particular embodiment is a scale 308 for weighing parcels and a barcode label printer 310 for printing mailing/shipping labels. This user terminal 300 also includes a report printer 312. As shown in FIG. 4A, a user terminal 300 such as that shown in FIG. 3 may be connected over a network 402 to a data center 404. The data center 404 in the embodiment shown in FIG. 4A is comprised of one or more web servers 406, one or more application servers 408, and one or more database servers 410, though there are numerous other possible configurations for data centers.

FIG. 4B is an illustration of an embodiment of a user terminal 412, which may be connected over a network 402 to a data center 404, wherein the user terminal 412 is comprised of at least a communication module 414, a synchronization module 416, application files 418, rating files 420 and shipping files 422, in an embodiment of the invention. The communication module 414 of FIG. 4B enables the user terminal 412 to receive and transmit information, data, files, applications, etc. with the data center 404 over the network 402. The application files 418 include at least a portion of the CMS and allow a user at the user terminal 412 to process and/or ship packages in the online or offline modes (discussed further herein). The user terminal 412 also includes at least rating files 420 and shipping files 422. The rating files 420 are used to store rating information for carriers that are supported in the offline mode. The information contained within the rating files is used to apply a shipping cost to packages when the user terminal 412 is unable to access the data center 404. The shipping files 422 include the preference settings for the user terminal 412 and the CMS. The shipping files also include information about shipping transactions that are processed in the offline mode, such information may include, for example, package weight and dimensions, address data, "bill to" data, international information, international data, commodity data, carrier and class of service, local retail rates, etc.

The synchronization module 416 provides for the update of application files 418 in the online mode and the synchronization of the application files 418, rating files 420, and shipping files 422 when access to the data center 404 from the user terminal 412 is restored after an outage.

In the embodiments of the present invention, certain features of the carrier management system will be disabled at a user terminal when a network connection between the user terminal and a data center is unavailable, lost or impeded. Although some features may be disabled, the user will be able to rate all or certain participating carriers and their services, pre-process and/or ship packages. In one embodiment, the user will receive time in transit and extended area data for all packages that can be shipped in offline mode, where extended area data is used to calculate additional shipping surcharges primary for rural delivery locations.

Access to offline processing may also be limited based on the number of hours used offline. This may be accomplished by preventing access to (i.e., "locking out") the offline mode after the user has used the offline mode for a pre-determined and configurable amount of time. A user may overcome being locked out because access to the offline processing application is available through a guest password even after lock-out. In an embodiment of offline processing, an unlock functionality is available that provides for access after lock-out for cases where a user is legitimately offline for an extended period of time.

Carriers that are activated for the selected shipping location when connected to the data center (i.e., "online"), are capable of being supported for user terminals associated with that shipping location when operating in the offline mode. While some features that are available in the online mode may not be available when the user terminal operates offline, generally all the essential services for supported carriers will be available and local retail rates for supported services will be available. For shipments created in offline mode a unique identifier such as, for example, a valid package tracking number, one is generated for each offline shipment. While in the offline mode, generated package data is stored on the user terminal and a traveler label (as described herein) or a shipping label is generated for the package. In one embodiment, particular information about a package such as a transaction type identifier ("ID") of "offline" will be stored for shipments created in the offline mode. This information may be stored in one or more databases (electronic or otherwise) containing shipment records for each package, as such databases are used for shipping purposes such as, for example, a package level detail (PLD) database as is used by UPS or databases residing on the user terminal. For some carrier management systems, this will be a new transaction type ID that will be created to identify shipments that originated in offline mode. In one embodiment and for security purposes, the transaction type ID will not be updated if the shipment record is edited or modified. This is more fully described below.

The full complement of services offered in the online mode of the CMS may or may not be offered in the offline mode. For instance, if all the carriers participating in the online mode of the CMS offer domestic and international shipping services, then full rating and shipping may be supported offline for all domestic and international for only a subset of all participating carriers, or it may be available for all participating carriers. A shipping label is generated in the offline mode only when a carrier account is active and commissioned for the shipping location while in the online mode. Time in transit data and calculations are generally supported for shipments made during the offline mode. For instance, and as an example, air time in transit data is derived from the UPS Air Commit database and exact time in transit data will be available for all domestic services except UPS Ground. Estimated time in transit data will be used for all UPS Ground shipments wherein time in transit for Ground shipments will be estimated as Zone minus 1 day(s). Generally, though, while in offline mode the time in transit information for shipments will be displayed as "not guaranteed" in the CMS's rate list. Estimated time in transit data will be generally be used for international shipments and their time in transit will be displayed as "not guaranteed" in the CMS's rate list. The decision whether more or less accurate time in transit calculations are done offline depends on the complexity of the carrier's time in transit algorithm and the size of the data files need to support calculations.

Offline Shipping Records

A carrier tracking number that is valid for the selected/specified carrier is generated for each offline shipment. If possible, the tracking numbers are randomized, as is generally implemented for online shipping in a CMS. Business rules for editing shipped package information are maintained in offline mode. For instance, business rules may require that once a package has been shipped, if that package's record information is edited, then the original package record is voided and a new record created for that shipment. A new carrier tracking number will be assigned to the new package record. A new package record and carrier tracking number will be created for each shipped and edited package when: a package is shipped in offline mode and edited in offline mode; a package is shipped in offline mode and edited in online mode; and, a package is shipped in online mode and edited in online mode.

Shipping labels may be generated when a package is shipped in offline mode. A shipping label produced offline will include the correct carrier's routing code for the shipment. In one embodiment, for international shipments, a Power of Attorney label is generated, if needed.

Package data for shipped packages is stored on the workstation until the connection is restored and synchronization occurs. The transaction type ID will be set to "offline" for packages shipped in the offline mode. Generally, estimated time in transit data will be used for all shipments. The current methodology of each supported carrier will used for estimating time in transit will be maintained for all supported services; however, shipments will be displayed as "not guaranteed" in the CMS's rate list.

A general illustration of the operation of an embodiment of the invention is shown in FIGS. 5A, 5B, and 5C. In FIG. 5A, a CMS is operating in its normal online mode with a user terminal 502 having a connection to a data center 504 over a network 506. In FIG. 5B, the network connection between the user terminal 502 and the data center 504 is lost, in this instance by a break 508 in the network 506. Even though the network connection between the user terminal 502 and the data center 504 is lost in FIG. 5B, the user terminal 502 is able to continue to process and ship packages because of the offline processing capabilities of an embodiment of the present invention. In FIG. 5C, the network connection between the user terminal 502 and the data center 504 is restored and the data stored on the user terminal 502 for packages shipped while the user terminal 502 was offline is synchronized with the data center 504 by use of a synchronization module (not shown), which may be located at the data center 504 or the user terminal 502.

Traveler Labels

For some carriers, actual shipments of packages while the CMS is offline may not be supported. However, such carriers may allow the use of traveler labels. Traveler labels are generated in accordance with the business rules and preferences of the entity controlling the CMS and the carrier. A traveler label is a label that is not used for shipping of a package but provides a cost estimate for shipping of the package and may be used to quickly recall the package information when the CMS application is able to re-connect to the data center. In one embodiment, United States Postal Service (USPS) packages may be pseudo-shipped and a generic shipping label generated, where pseudo-shipping indicates that postage is not applied at that point in the shipping process, but would be applied later by a separate postage meter. If a tracking number is required for the shipment, a waybill dialog for creating such a tracking number is displayed at the user terminal. A user's generic address label preference item is honored in the offline mode. Package data for offline pre-processed packages will be stored on the workstation until the connection is restored. The transaction type ID is set to "offline" for such pre-processed packages.

Drop-Off Packages

Drop off packages features will be supported while in offline mode. These features include packages that are packed and labeled by the shipper and brought to a facility having a CMS application for shipment. All carriers participating in the online CMS will be supported for offline CMS for drop-off packages. Package data for drop off packages is stored on the user terminal until a connection between the user terminal and the data center is restored. The transaction type ID of a drop-off package will be set to "offline."

Offline Storage

Application Files

Application, rating, and shipping files that enable offline processing of packages in the offline mode are stored on each installed CMS user terminal. Files are stored in a secure location in the user terminal's memory (e.g., hard drive). Required files are generally not stored long-term in the user's browser cache so that deleting the browser's cache should not adversely affect offline processing files stored on the user terminal.

Logon Functions

Users should be able to perform the following functions while offline: logon; price a package; process a package; print labels, which includes carriers' shipping labels, traveler labels, power of attorney labels, and receipt labels; save package information; find transactions; edit the last transaction; edit a transaction; void the last transaction; void a transaction; recall a voided transaction; reprint the last transaction; reprint a transaction; enter a drop-off package; generate reports/international documentation; modify peripheral settings such as, for example, scales and printers preference settings; obtain help for offline processing (offline help is specific to offline processing so that a CMS's entire help library is not required to be stored locally); and, obtain support information.

Shipping preferences (e.g. label printer settings) established while online are supported while offline. While offline, find dialogs of the CMS application return results only for transactions created during the current offline session, which allow a user to find, edit transactions, void transactions, recall voided transactions, reprint transactions, etc. that occurred while the user terminal was offline.

Tracking Numbers

A participating carrier's tracking reference number range is stored on each installed workstation. The tracking reference number range is used to create valid package tracking numbers for the participating carriers. The tracking reference number may comprise a part of a package tracking number, may be used to create a package tracking number, or may be the entire package tracking number. For instance, the UPS tracking reference number is positions 11-17 in a UPS "1Z" package tracking number. This is the part of the UPS tracking number that is incremented with each new package. In one embodiment, a block of unique reference numbers are stored on each user terminal to ensure that unique tracking numbers are created by multiple user terminals linked to the same carrier account (generally, package tracking numbers should be unique over at least a six month period). The tracking reference number range thus becomes a user terminal setting. The range is stored with the user terminal settings on the data center servers. The range is stored with the user terminal settings on the client (i.e., user terminal). In one embodiment, blocks of 10,000 numbers are stored on each installed user station, though the stored numbers may be selected randomly by the CMS application. For each carrier account, a given block of numbers is assigned to only one workstation. In one embodiment, tracking reference numbers beginning with the digits 5, 6, 7, 8, or 9 are reserved for offline use and tracking reference numbers beginning with the digits 0, 1, 2, 3, or 4 are reserved for online use.

Synchronizing Files

Applicable files are downloaded to each user terminal during installation of the offline processing capability, or otherwise stored in the user terminal's memory (e.g., by installation from CD-ROM, diskettes, etc.). The retail rates and preference settings that are associated with the current user's shipping location are synchronized on the client. If a user associated with a different shipping location has previously logged onto the client, then that user's settings may be overwritten. All files stored on the user terminal are automatically synchronized on logon when in online mode and when a connection to the data center is restored if the user terminal (i.e., client) has been operating offline. Files on the local user terminal that are out of date are replaced with current files from the data center.

Application Files

Application files residing on the client (i.e., user terminal) are also synchronized with the data center during online processing. Files necessary to run the CMS application at the user terminal are synchronized with data center files. Policy elements (i.e., business rules) used in offline mode are also synchronized with the data center during time of online processing. User terminal settings used in offline mode are synchronized with data center files during periods of online processing. Rating files including local retail rates for all carriers supported for that user terminal are synchronized with data center files during periods of online processing. Shipping files for carriers are also synchronized if the user terminal installation includes an active and commissioned account for that carrier.

Data Files

When the CMS application is offline, information about each shipping transaction conducted during that offline period is stored locally (at the shipping location). Offline data files may be stored in the existing offline rating directory. The storage location is a configurable value for each shipping location. Each stored transaction includes data recorded for each shipment, including but not limited to the following data elements (note that for each shipment stored, there may be multiple commodities, including multiple packages per shipment): package weight and dimensions; address data, including bill to data, international information, international data and commodity data; carrier and service; accessorials; and, local retail rates.

Synchronization

When a connection from a user terminal to the data center is restored, then the locally-stored transactions are synchronized with the data center's database. In one embodiment, synchronization is metered to prevent interruption of shipping processes. Synchronization occurs when an offline client is re-connected to the data center and a client logs on to the data center. The client is not returned to online mode until the local transactions are synchronized with the data center. Until synchronization is complete, the client continues to process shipments offline. Logon credentials are re-validated before local data files are synchronized. Once the offline transactions are uploaded and confirmed, the user terminal is then returned to online mode. If a client has an incomplete, but already rated, transaction in place when the client is returned to online mode, then that transaction is re-rated (using data center rates) before shipping is allowed. When the online connection is re-established, all locally stored transactions are uploaded to the data center's database. Once synchronized, locally stored transactions are removed from the offline rating directory.

Shipments Made Offline

Shipments that are made during offline processing will be added to the appropriate carrier's manifest during synchronization. The shipments will be added to the manifest with the matching "ship date" and carrier account number. If no manifest exists for a particular carrier's shipments, a new manifest will be created for those shipments, in which case a "No Manifest Warning" message will be displayed. All shipments shipped offline will be re-rated. Rating data will be added to each package record. Rating data includes cost rating data, published rating data, and expected delivery date and time. Retail rates stored with the local file are not overwritten when the shipment is re-rated. Retail rates as created on the local workstation (i.e., user terminal) will be maintained.

Some CMS systems prepare and send shipment notification messages to intended recipients. These messages may be in the form of an email, facsimile, paging signal or some other electronic transmission. Shipment notifications will be prepared and sent if the shipment was processed fewer than 24 hours or other configurable time period from the upload time, the ship date is the current date, or the ship date is in the future. Shipment notifications for older shipments (outside of the configurable time period) will not be sent.

Also, some CMS systems prepare and send delivery notification messages to shippers. These messages may also be in the form of an email, facsimile, paging signal or some other electronic transmission. Delivery notifications will be prepared and sent if the package has not been delivered as of the upload time or the package was delivered within 24 hours (or other configurable time period) of the upload time.

Universal Logon

Online Logon

Universal logon is available on the data center's servers. Universal logon comprises systems and methods where a user logs on to a CMS through the local user terminal using logon credentials established while said user terminal is connected with a CMS data center. Software of embodiments of the present invention automatically detects a connection state between the user terminal and the data center and sends the user at the user terminal to an offline mode when the user terminal is unable to detect a connection between the user terminal and the data center. In the offline mode, some features of the CMS application are deactivated, as further described herein, however the user is still able to pre-process, process and ship packages in the offline mode at the user terminal.

Applications residing on the data center's servers, other than the CMS application that resides at least in part on the user terminal, are available only while online. Online refers to the ability of the user terminal to access the data center over a network and for the user terminal and the data center to communicate with one another. The network may be wired, wireless, optical or combinations thereof. An example of the network would be the Internet, though other networks may be used. Offline processing is available from user terminals having offline processing capability of a CMS application. Offline processing for CMS applications is generally only installed at user locations only while such user locations are online. All offline files are synchronized each time a user logs on to a user terminal while a user terminal is online with the data center. Offline files that will be synchronized with the data center include application files, locally stored transactions, rating files, and shipping files.

Offline Logon

In one embodiment, universal logon is available for a CMS application while offline. If the data center is not available, then offline logon will be allowed for the CMS. Offline logon is available at the user terminal for the CMS application. For instance, in one embodiment, Professional Shipping Station (PSS)™ or Counter Manifest System™ as these systems are offered by iShip Inc. of Bellevue, Wash., will be available in the application drop down list at the user terminal. When offline, the user's logon credentials will be validated against the user names and passwords stored on the user terminal. If the data center is available, then the user's credentials will be validated against the online user database. Any user who has successfully logged onto a user terminal while in online mode may logon to that user terminal while in offline mode if an offline mode privilege is "on" for the user. The user's logon credentials will be stored on the local machine. The user's logon credentials include the user's logon name; the user's password (usually encrypted); and, the user's enterprise ID (if in an enterprise application). If the offline mode privilege is "off" for the user, then the logon credentials will not be stored on the local machine and the user will not be able to logon to the user terminal in offline mode using the user's password and ID. A user may not change their password while in offline mode. If a user changes their password while in online mode, the locally stored credentials will be updated with the new credentials. Only users who successfully log into the CMS application will be stored as offline users on the user terminal. Offline logon may be disabled for a user terminal.

Locking Offline Logon

Offline logon is locked for a given user terminal when the user terminal has run in offline mode and the user terminal has not reconnected to the data center after a configurable number of hours specified in an offline processing expiration policy element (a/k/a "offline expiration"). Offline expiration is further described herein. Locking offline logon is independent of the user logging onto the CMS application. If offline logon has been locked for the user terminal then the universal logon screen will continue to be available. When a user station is locked and a user attempts to logon, a locked dialog will be displayed to the user.

Guest Logon

A "guest user" logon will be available when the data center is unavailable. The "guest user" will be available for enterprise accounts for which the allow guest mode policy element is "on." A guest logon name and password will be allowed on each installed user station having offline processing capabilities. A "guest user" may have, for example, a logon name of "Guest" and a password of "Guest." The "guest user" logon will be available when offline logon has been locked.

A guest logon alert is displayed when a connection cannot be established to the data center, a user attempts to logon and his/her logon credentials cannot be verified locally, and the allow guest mode policy element is "on." If the allow guest mode is "off" for the user and if logon validation fails, standard error handling will occur. In one embodiment, the Guest Logon alert contains the text and controls shown in FIG. 6. FIG. 6 is an exemplary logon alert dialogue box 600. The Logon alert has a title 602 of "Logon Alert" and contains the following text: informative text 604; help button 606; and OK button 608.

The informative text 604, in one embodiment, is: "Your User ID and Password cannot be verified at this time. Currently, <the CMS application> is unable to connect to the data center. The application is only able to verify users who have previously logged on to this user terminal. Please try your logon again or logon as 'Guest.' Logging in as 'Guest' will allow you to rate and save packages until a connection to the data center is re-established. Enter the following on the Logon page:
User ID: Guest
Password: Guest
Call support for assistance: <CustomSupportNumber>
Click Help for more information." Where <the CMS application> is the name of the carrier management system residing at least in part on the user terminal, in this instance, Carrier Manifest System™.

The Help button 606 is defined as having a button label of "Help" and a hotkey of "H." When clicked, an "Offline Help" file or files open and the logon alert remains open.

When the OK button 608 is clicked, the logon alert dialogue box 600 closes and the user is returned to the logon page.

The CMS application opens in guest mode when a connection to the data center cannot be established or a user enters "guest" logon credentials (i.e., the entered User ID is "Guest" and/or the entered Password is "Guest"). The CMS application should not open in guest mode when a connection to the data center is found.

Offline Expiration

Offline Mode Privilege

A policy element may be added at the enterprise, organizational unit (OU), and user levels of the CMS application to control whether or not the CMS application may function offline. An offline privilege checkbox is added to the CMS application's "User Privileges" panel. The checkbox label may be "Offline Processing" and the default state may be "checked." When checked, logon credentials (as previously described) are stored on each local user terminal. When unchecked, logon credentials are not stored on the local workstation.

In one embodiment, an offline processing drop-down menu item is added to the site configuration menu item of the CMS application at the user terminal and the menu item label is "Offline Processing." An exemplary illustration of this menu item 700 is shown in FIG. 7A. In FIG. 7, the hotkey 702 for executing the offline processing is "O". When selected, the offline processing panel as shown in FIG. 7B opens and is displayed at the user terminal. FIG. 7B illustrates and exemplary offline processing panel for display on a user terminal in an embodiment of the invention. The offline processing panel 704 as shown in FIG. 7B is defined as having a dialog title box 706 of "Offline Processing." The offline processing panel 704 of FIG. 7B contains the following: explanatory text 708; recover button 710; and a close button 712.

The explanatory text 708, in an embodiment of the invention, is: "Offline Processing <the CMS application> will continue to function in an offline mode if a data center connection cannot be established. The files necessary to function in an offline mode will be stored on this user terminal. Each time you logon, the files will automatically synchronize. Click the recover button below only if your offline processing files are corrupt or a support technician asks you to. If some of your offline files have been deleted, log off and log back on to the <CMS application> to refresh the files."<The CMS application> is the application name for the carrier management system.

In one example, the recover button 710 is labeled as "Recover Files Now." The hotkey for the recover button 710 is "R." Instructional text associated with the recover button 710 that displays near the button, in one example, is "Download and replace ALL Offline Processing files. NOTE: This is a substantial download, up to <X> MB." Where <X>=the largest download size possible for all offline processing files. When the recover button 710 is clicked a confirmation pop up panel 714 as shown in FIG. 7C is displayed at the user terminal. The offline processing panel remains open behind the confirmation pop up 714. The text associated with the confirmation pop up 714 provides that "Recover requires the data center to download and replace all of your Offline Processing files on this user terminal. This may take some time. <the CMS application> will not be available while the files are downloading. Are you sure you want to continue at this time?"

If "No" is selected by the user, then the confirmation pop-up 714 closes and the user returns to the offline processing panel. If "Yes" is selected by the user, then the confirmation pop-up 714 closes, the offline processing panel closes, and all offline processing files are removed from the user terminal. Once all offline processing files are removed from the user terminal, all offline processing files are downloaded and stored on the workstation. As shown in FIG. 7D, a download progress dialog box 716 opens. In one example, the text for the download progress box 716 is "Downloading Offline Processing files . . . " When the Offline Processing files have been downloaded, the Download Progress dialog box 716 reflects the status of the download with the text 718: "Download Complete. All Offline Processing files have been downloaded," as shown in FIG. 7E.

Offline Mode

An offline expiration policy element controls the amount of time (e.g., how many hours) the CMS application may function in offline mode before the application is locked and no longer accessible in the offline mode. The number of hours set in the offline expiration policy element is selective and may be stored on the workstation. When the CMS application goes offline, an expiration countdown begins on the workstation. The number of hours in the expiration countdown equals the number of hours set for the Offline Expiration policy element plus the number of hours from the time that CMS application went offline until 8:00 AM local time the following morning. For example, if the Offline Expiration policy element is 48 hours and the CMS application goes offline at 3:00 PM, then the countdown will be 48 hours+17 hours, equaling a total of 65 hours. The time that the CMS application goes offline is gathered from the user terminal's clock. When a connection is re-established, the countdown clock is stopped and reset. The countdown is not stopped if a user logs out or exits the CMS application while in the offline mode, the countdown is continuous from the moment the CMS application goes offline until a connection is re-established. In one embodiment, specified time intervals cause an Offline Expiration Warning dialog to display. When the countdown reaches zero, the CMS application is disabled completely and users are prevented from logging on to the CMS application at the user terminal. The CMS is closed, if it is open at the time it is disabled.

The offline expiration policy element may be added at enterprise and OU levels to control how long a shipping location may function in the offline mode. OU levels may be used in a corporation with many departments and geographic locations where it is useful to divide up the users into different organization units based upon department and/or geographical affiliations. The top level of control of an organizational unit is the enterprise level. An offline expiration drop-down list, for instance, may be added to the CMS application's "Application Settings" panel. The drop-down list may contain, for example, the following numbers in ascending order: 24, 48, 72, 96, 120, 144, and 168. In one embodiment, the default selection may be "48." The number selected represents the number of hours that a shipping location is allowed to function in offline mode before all offline application functionality is disabled, as described above.

Offline Expiration Warning

An Offline Expiration Warning dialog 800 as shown in FIG. 8 is displayed at the user terminal when a user terminal has been offline for an extended period of time. The Offline Expiration Warning dialog 800 displays cyclically during the countdown period. For instance, the warning may display once every 24 hours from the time the expiration countdown begins until 30 minutes before expiration. When the countdown reaches 30 minutes before expiration, the Expiration Warning dialog 800 displays, for example, at the following intervals: 30 minutes before expiration, and then two minutes before expiration.

The Offline Expiration Warning dialog 800 has, in one embodiment, a layout as shown in FIG. 8. The dialog title 802 is "Offline Warning." The Offline Expiration Warning dialog 800 contains the following controls: informative text 804, Help button 806, Check Connection button 808, OK button 810, and OK countdown 812.

The informative text 804 may be, for example, "This workstation has been offline for an extended period of time. Proper shipment processing, billing, and tracking can be adversely affected if a connection is not re-established soon. For security purposes, this Workstation will be disabled if a connection is not re-established in <Countdown>. If you are unable to re-establish a connection by that time, you must call support for assistance: <CustomSupportNumber>. Click Help for more information." Where <Countdown> is the time left before the application is disabled as determined by a configurable setting. Generally, the countdown displays in whole hours unless there is less than one hour before the application is disabled. The word "hours" displays to the right of the number of hours. If there is less than one hour before the application is disabled, then the countdown displays in whole minutes. The word "minutes" displays to the right of the number of minutes if there is less than one hour before the application is disabled. Where <CustomSupportNumber>=the custom Support number specified for the account.

The Help button 806 may be defined as having a button label of "Help" and a hotkey of "H". When the Help button 806 is clicked, Offline Help opens and the Offline Expiration Warning dialog 800 remains open. When the OK button 810 is clicked, the Offline Expiration Warning 800 closes. If logging on, the user is directed to their default page. If the CMS application was already open, then the user is returned to their original location within the application.

The OK countdown 812 is defined as being displayed on a side of the button bar on the user terminal display. The countdown starts at a specified time such as, for example, 5 minutes, and when the countdown reaches zero, the Expiration Warning dialog 800 closes.

Offline Expiration

When the countdown reaches zero for a user terminal that has been offline, the "locked dialog" 900 as shown in FIG. 9 is displayed. The locked dialog 900 displays when the CMS application has been disabled and the user attempts to logon or when the CMS application is disabled while the user is still logged on.

The locked dialog 900 is, in one embodiment, defined as having the layout as show in FIG. 9. The dialog title 902 is "Workstation Locked." The Locked dialog 900 contains the following controls: informative text 904, Help button 906, OK button 908, and Unlock Key button 910.

The Informative text 904 may be, for example: "A connection to <the CMS application> was not re-established in the allotted time. For security purposes, this Workstation has been locked. We apologize for any inconvenience. All functionality will be restored when your connection is re-established. To restore offline functionality immediately, you must call support for assistance: <CustomSupportNumber>. Click Help for more information." Where <CustomSupportNumber>=the custom Support number specified for the account.

The Help button 906 is defined as having a button label of "Help" and a hotkey of "H." When the Help button 906 is clicked, Offline Help is opened and the Locked dialog 900 remains open.

When the OK button 908 is clicked, the Locked dialog 900 closes and the CMS application exits, if it was open. The user is then directed to the user terminal's user interface.

The Unlock Key button 910 is defined as having a button label of "Unlock Key" and a hotkey of "U." When the Unlock Key button 910 is clicked, the Unlock Key dialog opens and the Locked dialog 900 remains open.

Guest Mode Privilege

A policy element may be added at the enterprise and OU levels to control whether or not the CMS application may function in guest mode, as previously described, once it has been locked out by the offline expiration element. An "Allow Guest Mode" privilege checkbox may be added to the "Application Settings" panel. The checkbox label may be "Allow Guest Mode" and the default state is "checked." When checked, guest mode privileges are permitted for shipping locations within that account. When unchecked, guest mode privileges are not permitted for shipping locations within that account.

Unlock Mode
Unlock Key

A "back door" is provided into the offline processing for a CMS application for all installed clients. The intent of the "back door" is to allow an extension of full offline mode in case of a legitimate extended outage. However, this "back door" should be useable only in limited cases when an extended outage occurs; therefore, the unlock key should change with each use. A user who wishes to continue in offline mode after the expiration of offline processing should call a support services provider, who calculates the unlock key for that user's session. The unlock key will be calculated from an initial value.

An unlock key is provided for a user terminal. The unlock key is available for use at a user terminal when the data center is unavailable, offline logon has been prevented for the user terminal, and the user terminal has connected to the data center within a certain period of time (e.g., the past 30 days). Unlock functionality will be disabled (e.g., "expiration") after the user terminal has been offline for the designated period of time, or longer (e.g., 30 days).

When the Unlock Key button 910 is clicked on the Locked dialog 900, an exemplary Unlock Key dialog 1000 as shown in FIG. 10 opens. The exemplary Unlock key dialog 1000 in FIG. 10 contains instructions 1002, initial value 1004, unlock key text-entry field 1006, unlock button 1008, and cancel button 1010.

Operating in the Offline Mode

When a data center connection cannot be established, the CMS application retains the functionality as described below. The functionality of the offline processing system occurs through one or more applications residing on the local user terminal with no reliance on the data center's servers. When a connection to the data center's servers cannot be maintained or established, the CMS application functions in an offline mode. The offline mode retains limited functionality of the online CMS application, as described herein.

FIG. 11 is an exemplary illustration of a screen 1100 for processing a package in a typical CMS application, wherein the CMS application is operating in offline mode, in an embodiment of the invention. In this example, the CMS application is UPS Customer Center Professional Shipping Station, although other CMS applications may be used. Referring to FIG. 11, when in the offline mode, the displayed alert message 1102 is "No Connection Established: OFFLINE." The text of the alert message in one embodiment may be bold red so as to be conspicuous, though other colors and/or fonts may be used. The functionality of the offline processing application occurs on the user terminal and reliance on the data center servers is not required. The help files 1104 that are accessible in the offline mode generally contain offline-specific topics only. When in the offline mode, addresses 1106, 1108 may not be saved in the user's online address book. Also while in the offline mode, commodities are not saved. In this usage, "commodities" refers to a list of the description of goods contained inside an international shipment and may be useful and/or required for customs purposes. While in the offline mode, the CMS application will rely on the clock of the user terminal for delivery dates and times, rather than the data center clock. Shipping labels for some or all of the supported carriers will be available. Address verification and validation is disabled for all addresses (i.e., the validation state for each new address is "Not Validated"). A search for a package record does not occur if a value is entered into the PSO/EPSO/Package Number field 1110 on the process a package page 1100 and automatic searching is disabled in the Offline Mode. The PSO/EPSO/Package Number is a unique number that identifies a package/shipment but that is different than the carrier tracking number.

In the embodiment of FIG. 11, the following controls are grayed out and unavailable when CMS application is operating in the Offline Mode: the PSO/EPSO/Package Number Find button 1112; (the find mechanism for the PSO/EPSO/Package Number text-entry field 1110 is disabled); the Ship From Nickname/Telephone text-entry field 1114; the Ship From Find button 1116; the Ship To Nickname/Telephone text-entry field 1118; and, the Ship To Find button 1120. Other screens (not shown in FIG. 11), may have other fields grayed out, including the Save checkbox on the Ship From Address, Ship To Address; the Address Book button on the Ship To address dialog, and the Save Commodity checkbox on the Additional Information dialog.

FIG. 12 is an exemplary illustration of a screen 1200 for pricing a package in a typical CMS application, wherein the CMS application is operating in offline mode in an embodiment of the invention. On the price a package page 1200, the Perform End of Day button 1202 is grayed out and the Alert message area 1204 contains the following message: "<CMS application> is currently offline. A connection to <the data center> cannot be established. An alert will notify you when a connection is re-established. To test your connection manually, select Check Connection from the Process menu." In one embodiment, the message is in bold red, though other colors and/or fonts may be used.

Referring to FIGS. 11 and 12, several menu items that are available when the CMS application is operating in the online mode. When operating in the offline mode (not connected to the data center), several menu items are generally grayed out and unavailable on both the process a package 1100 and price a package 1200 pages. For instance, under the "Process" menu 1206, the "First Class Mail Calculator" and the "Freight Insurance" menu items may be unavailable. The entire "Manifest" menu 1208 may be grayed out and unavailable. Under the "Reports" menu 1210, all menu items other than "International Documentation" may be grayed out and unavailable. Under the "Administration" menu 1212, all menu items are grayed out and unavailable except for "Site Configuration>Scales and Printers." In the "Help" menu 1214, the "What's New," "About . . . ," and "Refresh Alerts" menu items are unavailable.

Offline Package Processing

Shipping labels and/or traveler labels may be produced for carriers that participate in the CMS application when online. As previously described, a traveler label is a label that is not used for shipping of a package but provides a cost estimate for shipping of the package and may be used to quickly recall the package information when the CMS application is able to re-connect to the data center. Some carriers may not want items shipped while the shipping location is operating in offline mode, thus a traveler label is associated with packages that are to be shipped by that carrier. The traveler label thus expedites shipment once the network connection between the shipping location and the data center is re-established. In one embodiment, a "No Label" icon such as, for example, the "Ø" 1122 as shown in FIG. 11, is displayed for carriers that choose not to ship packages in the offline mode.

When a carrier that chooses not to ship in offline mode is selected when the "Ship It" button 1124 of FIG. 11 is clicked, a traveler label is generated instead of a shipping label. Also, a generic shipping label may be printed for United States Postal Service (USPS) shipments. The user's address label preference items are honored, if any. The package information is saved locally as a pre-processed shipment and the package will be held at the shipping location. If the package is a shipped USPS shipment, the package is saved locally as a processed shipment.

When an international shipping label is generated while offline, an international document alert may display on one or more of the CMS application pages (see FIGS. 11 and 12). The alert text, if displayed, provides that "International Documentation cannot be produced when <the CMS application> is offline. You will be able to produce the appropriate documentation for this shipment when a connection to <the data center> is re-established. However, if a connection is not re-established before the carrier arrives, be sure to manually prepare all international documentation for this shipment or risk delaying delivery. Blank international documents may be printed from the Reports Menu."

If "OK" is clicked, then the appropriate shipping label is generated. If the selected carrier is one that allows offline shipping, then a shipping label and a power of attorney label, if applicable, are generated. If the selected carrier is not one that allows offline shipping, then a saved estimate (i.e., traveler) label is generated. The package and any package information are stored locally. The international document alert is displayed on one or more CMS application screens when the shipment is international (i.e., outside the U.S.), including Canada. The international document alert is not displayed on one or more CMS application screens when the destination of the shipment is domestic.

Operating in the Guest Mode

Guest mode functions similar to the offline mode. However, in guest mode no shipping labels are produced. A "No Label" icon is displayed next to every service in the rate list on the CMS application screens. The "Ship It" button 1124 is renamed to "Save" and when "Save" is clicked, a saved estimate (i.e., traveler) label is produced. Shipping label preferences for various carriers are honored. The package and package information is saved locally as a pre-processed shipment.

Connection Status
Connection Check

A manual "Connection Check" function is available for the CMS application when the CMS application is operating in offline mode. The "Connection Check" menu item is added to the "Process" menu 1206. The menu item label is, for example, "Check Connection" and the hotkey may be "C." The hotkey for copy "Ship From" to "Ship To" is "F". The "Check Connection" menu item is only available for the CMS application when in the offline mode. If operating in the online mode, then the "Connection Check" menu item is not displayed in the menu of the CMS application.

When the "Connection Check" function is selected, a search for a connection between the user terminal operating the CMS application and the data center servers occurs. While the search is occurring, a Check Connection Status panel is displayed at the user terminal. An embodiment of this Check Connection Status panel 1300 is shown in FIG. 13. The text 1302 of the Check Connection Status panel 1300 is "Checking Connection . . . " An animated gif may be displayed under the text 1302. The CMS application is not available while the connection check is occurring. The Check Connection panel 1300 may display for a minimum amount of time such as, for example, two seconds, regardless of how long the check may take to give the user a moment to recognize what is flashing on the screen.

If a connection cannot be established, then the Check Connection Status panel 1300 closes and a "Lost Connection" alert is displayed. If a connection is found, then the Check Connection Status panel 1300 closes and the "Manual Connection Found" alert opens.

A certain time period is established such that an automatic search for a connection to the data center servers occurs cyclically after the time period has lapsed while the CMS application is operating in the offline mode. For example, an automatic search for a connection between the user terminal operating the CMS application and the data center may occur every five minutes when the CMS application is in the offline mode. When a connection check occurs automatically, the Connection Check Status panel 1300 is not displayed. The Connection Check Status panel 1300 is displayed when a "Connection Check" is manually requested. The CMS application is available and functional in the offline mode while the automatic connection check is occurring.

If a connection is not found during an automatic connection check, then nothing is displayed to the user and the CMS application continues to operate in offline mode and the CMS application will continue to check for a re-established connection every five minutes. If a connection between the user terminal and the data center is found, the application remains offline until local transactions are synchronized.

Lost Connection

A lost connection is defined as when the data center cannot be reached by the CMS application operating on a user terminal. For example, the data center is offline, the user's network is down, the user's Internet connection is down, communication with the data center takes more than a predefined timeout period to complete, etc. A "Lost Connection" alert 1400 as shown in FIG. 14 is displayed when a user attempts to logon to a CMS application in online mode and a connection to the data center cannot be established or a connection to the data center is lost while logged on to the CMS application. The title 1402 of the Lost Connection alert 1400 is "Connection Alert." The Lost Connection alert 1400 may include informative text 1404, a "Help" button 1406, a "Retry" button 1408, and a "Work Offline" button 1410. The informative text 1404 provides "A connection to <the data center> cannot be established. Click Retry to retry your transaction request. Click Work Offline to continue in Offline Mode. An alert will notify you when the connection is re-established. Click Help for more information."

The Help button 1406 is defined as having a button label of "Help," and a hotkey of "H." When clicked, Offline Help is opened and the Lost Connection alert 1400 remains open. The Retry button 1408 is defined as having a button label of "Retry" and a hotkey of "R." When clicked, the transaction that timed-out is re-sent to the data center. The Lost Connection alert 1400 is unavailable while the transaction is being re-sent and the "Help" button 1406, the "Retry" button 1408, and the "Work Offline" button 1410 are each grayed out and unavailable while the retry is attempted. The Connection Check Status panel 1300 is displayed while the connection check is taking place.

If the transaction fails, the Connection Check Status panel 1300 closes and the Lost Connection alert 1400 becomes available again. If the transaction is successful, then the Lost Connection alert 1400 closes and the transaction completes. The user then continues in online mode.

The "Work Offline" button 1410 is defined as having a label of "Work Offline" and a hotkey of "W." When the "Work Offline" button 1410 is clicked, then the Lost Connection alert 1400 closes, the CMS application switches to offline mode, any unsupported dialog boxes close, and the user is returned to the page (i.e., screen) the user was on. All functionality of the CMS application that is not available in offline mode will be disabled.

If any data was entered in the user interface or browser of the user terminal prior to the connection being lost, the data is retained. If the "Save Address" checkbox is checked on either shipping address dialog, the checkbox is manually unchecked before address storage is disabled. If a package was being processed, and rates were retrieved prior to losing the connection to the data center, the package is re-rated in offline mode. If a "Ship It" transaction times out before it is completed, then the "Ship It" command will not complete and the user is required to click "Ship It" again in the offline mode.

Connection Found

A "Found Connection" is defined as the CMS application operating on the user terminal sending a signal over the network and receiving a return signal from the data center. In other words, the data center can be "pinged" or communication with the data center takes less time than the defined timeout period to complete. When a connection to the data center is found, the application remains offline until all local transactions are synchronized.

Referring to FIG. 15, when a connection to the data center is found after such a connection had been lost, a Connection Found Initializing/Synchronizing alert 1500 is displayed. During this initialization/synchronization period, a search for offline packages stored locally (e.g. on the user terminal, a local server, a local storage device, etc.) and not yet uploaded occurs. The alert message in the "Process a Package" menu bar changes to the text: "Connection Found: Initializing . . . " In one embodiment, the text is blue, though other colors may be used. While initializing, the application continues to function in the offline mode. If information about packages processed while in the offline mode is found locally, the alert message in the "Process a Package" menu bar remains "Connection Found: Initializing . . . " until synchronization with the shipping location is initiated from the data center.

Before the data center initiates synchronization with the user terminal, logon credentials stored locally at the shipping location are verified with information about authorized users at the data center. If the locally stored logon credentials are valid, synchronization between the data center and the user terminal begins. The alert message in the "Process a Package" menu bar then changes to the text, "Connection Found: Synchronizing . . . " In one embodiment, the text is black. The CMS application continues to function in the offline mode while synchronization is in process. When synchronization is complete, a "Connection Re-established" alert is displayed at the user terminal. If the stored credentials are not valid, a logon re-validation dialog is displayed at the user terminal.

Even if packages were not shipped using the user terminal while the terminal was in the offline mode, locally stored logon credentials are verified with the authorization information residing at the data center. If the locally stored logon credentials match those stored at the data center, a connection re-established alert is displayed. If the stored credentials do not match, the logon re-validation dialog is displayed at the user terminal.

A "Manual Connection Found" alert 1600 such as that shown in FIG. 16 is displayed when a manual connection check is requested and a connection between the user terminal and the data center is found. The "Manual Connection Found" alert 1600 displays if a connection is found as a result of a manual connection check and there are local transactions stored on the user terminal that have not yet been synchronized with the data center. The "Manual Connection Found" alert 1600 is not displayed if a connection is found when the connection check is automatic. If there are no local transactions stored on the user terminal, then the "Manual Connection Found" alert 1600 is not displayed and the locally stored logon credentials are verified. If the stored credentials are valid, the "Manual Connection Found" alert 1600 is displayed. If the stored logon credentials are not valid, the logon re-validation dialog is displayed.

Referring to FIG. 16, the title 1602 of the Manual Connection Found alert 1600 is "Connection Alert." The text 1604 of the alert, in one embodiment, is: "A connection to <the data center> has been found. This workstation will need to synchronize with <the data center>. During this time, <the CMS application> will continue to function in offline mode. An alert will notify you when synchronization is complete." When the "OK button" 1706 is clicked, the "Manual Connection Found" alert 1700 is closed. The information about packages that are prepared for shipment or shipped in the offline mode is then synchronized with the data center.

When a connection between a user terminal and the data center is properly re-established, a "Connection Re-established" alert 1700 as shown in FIG. 17A is displayed at the user terminal. The "Connection Re-established" alert is displayed when a connection is found between the user terminal and the data center, the logon credentials are validated successfully, and synchronization, if necessary, is completed successfully.

In some instances, documents for international shipments may not be prepared in the offline method. Therefore, if information about an international package that was prepared for shipment while the user terminal was offline is found in the locally stored user terminal package information, a separate "Connection Re-established" alert 1702 may be displayed, as shown in FIG. 17B. As in FIG. 17A, the title 1704 is "Connection Alert," however, the text 1706 of the alert 1702 contains international reminder text 1708 such as, for example, "REMINDER: Be sure to prepare documentation for your international shipments, if you haven't done so already. Documentation for each international shipment is now available from Reprint Transaction."

The international reminder text 1708 is displayed when at least one of the following types of international shipments has been synchronized with the data center during the latest connection to the data center, a shipment with a Canadian destination or a non-documents shipment with an international destination. Also, for the international reminder text 1708 to display, the ship date of the offline international shipment must not be in the past (from the time of synchronization). The offline international shipment's ship date must be the current date or a date in the future. The international reminder text is not displayed if an international shipment's ship date is a date in the past (prior to synchronization). The international reminder text 1708 is not displayed when no international shipments were processed offline, or all international shipments processed offline were documents-only and each destination was not Canada. When the "OK button" 1710 of the "Connection Re-established" alert 1700, 1702 is clicked, the "Connection Re-established" alert 1700, 1702 is closed and the user is returned to their location in the CMS application. If any data was entered in the user interface of the user terminal prior to the connection between the user terminal and the data center being re-established, the data is retained locally and synchronized with the data center. If a current shipment has been rated while in the offline mode but not shipped, the transaction will be automatically re-rated once the connection between the user terminal and the data center is re-established. Once the connection between the user terminal and the data center is re-established, the CMS application functions in its online mode as is currently implemented and all online functionality is restored.

Logon Re-Validation

A User ID and password may be required when a connection between a user terminal and the data center is re-established. If the logon credentials used to logon to the CMS application in the offline mode do not match the credentials stored on the data center once a connection has been re-established, a mini logon dialog (e.g. Logon Re-Validation dialog) 1800 as shown in FIG. 18 is displayed at the user terminal. The title 1802 for this dialog box is "Connection Alert". The "Logon Re-Validation" dialog 1800, in one embodiment, includes instructional text 1804, User ID text-entry field 1806, password text-entry field 1808, submit button 1810, and cancel button 1812. The instructional text 1804 may be, for example: "Your User ID and Password are required to re-establish your connection to <the data center>." The User ID text-entry field 1806 is displayed under the instructional text 1804. The logon User ID is a required field. The password text-entry field 1808 is displayed under the User ID field and its label is "Password." The Logon password is a required field. When "Submit" 1810 is clicked, online validation as is currently implemented by the CMS application for User ID and Password occurs. The "Submit" button 1810 is disabled until a user name and password are entered. If validation of the user name and password passes, the user is logged on; however, traditional logon does not occur (e.g. synchronization, loading controls, etc.), and the user returns to their original state in the CMS application. Synchronization then commences and until synchronization is complete, the CMS application functions in offline mode. The alert in the "Process a Package" menu bar changes to "Connection Found: Synchronizing . . . " and when synchronization is complete, the "Connection Re-established" alert is displayed. If validation fails, error handling as is currently implemented by the CMS application occurs and a Logon Failure alert 1900 as shown in FIG. 19 is displayed at the user terminal.

Logon Failure

When the Cancel button 1812 of FIG. 18 is clicked, the Logon dialog 1800 closes and a Log Off alert 1900 is displayed. The Log Off alert 1900, in one embodiment, contains informative text 1902, an "Exit" button 1904, and an "OK" button 1906. The informative text 1902 may be, for example, "You will have to exit the application if you do not supply your <UserID> and Password now." The "Exit" button 1904 may be defined as having a button label of "Exit" and a hotkey of "x." When the "Exit" button 1904 is clicked, the Log Off alert 1900 closes and a "Are you sure . . . " (i.e., "End of Day") alert is displayed. If "Yes" is clicked on the End of Day alert, a mini logon dialog is display. When the "OK" button 1906 is clicked, the Log Off alert 1900 is closed and the user is returned to the mini logon dialog.

Modify Rates

Synchronize Alert

When rates are modified while online, Offline Processing is "On" for the account, or the Close button on the Modify Rates dialog is clicked, a Synchronize Alert 2000 as shown in FIG. 20 is displayed.

The Synchronize Alert 2000 is defined as having a title of "Synchronize Offline Processing." The Synchronize Alert text 2002 may be, for example: "These changes will not be available immediately for Offline Processing synchronization. Be sure to log off and log back on within the next 12-24 hours to synchronize." When the OK button 2004 of the Synchronized Alert 2000 is clicked, the alert closes.

FIG. 21A is a flowchart of a process for processing packages when a user terminal loses its ability to access a data center in an embodiment of the invention. The process begins at step 2100. At Step 2102, the user is processing packages in the online mode while the user terminal is able to access the data center. At Step 2104, the user terminal loses its ability to access the data center. At Step 2106, the user continues to operate the user terminal and process packages in the offline mode. The process ends at Step 2108.

FIG. 21B is a flowchart of a process for synchronizing a user terminal that is processing packages in the offline mode with a data center once the ability of the user terminal to access the data center is restored, in an embodiment of the invention. The process starts at Step 2110. At Step 2112, a user is operating the user terminal in the offline mode while processing packages. At Step 2114, access to the data center from the user terminal is restored. At Step 2116, data on the user terminal is synchronized with that of the data center. At Step 2118, the user operates the user terminal in the online mode and continues to process packages for shipping.

FIG. 22 is a flowchart of a process of offline processing for packages utilizing a CMS application in an embodiment of the invention. The process begins at Step 2200. At Step 2202, a user launches a web-based logon page stored locally at a user terminal with a web browser. At Step 2204, the user terminal attempts to connect with a data center over a network, and it is determined whether such connection is possible. If, in Step 2204, it is not possible to establish a connection between the user terminal and the data center over the network, then in Step 2206, a CMS application residing at least in part on the user terminal is operated in offline mode, and in Step 2208, certain unsupported online functionality (e.g., address books, etc.) are deactivated while operating in the offline mode. The process then returns to Step 2204 to determine if an online connection between the user terminal and the data center can be established. At Step 2210, if a connection between the user terminal and the data center is found, then the CMS application at the user terminal will be run in online mode. At Step 2212, it is determined whether there is any local transaction information stored at the user terminal as a result of shipping transactions that were conducted at the user terminal while operating in the offline mode. If there were local transactions conducted during the offline mode, then at Step 2214 the offline transaction information is synchronized with that of the data center. If, at Step 2212, there is no offline transaction information, then the process goes to Step 2216 where all CMS application functionality is implemented and the process operates in the online mode. The process ends at Step 2218.

FIG. 23 is a flowchart of a process of offline processing for packages utilizing a CMS application in another embodiment of the invention. The process begins at Step 2300. At Step 2302, a user is operating a CMS application at a user terminal in online mode for the processing of packages for shipment. At Step 2304, the CMS application on the user terminal determines whether it is able to access a data center over a network. If, in Step 2304, the CMS application residing at least in part on the user terminal is able to access the data center, then the process returns to Step 2302 and the user terminal continues to operate in the online mode. If, at Step 2304, it is not possible to establish a connection between the user terminal and the data center over the network, then in Step 2306, certain unsupported online functionality (e.g., address books, etc.) are deactivated, and at Step 2308 the CMS application residing at least in part on the user terminal is operated in offline mode. The process then continues to Step 2310 where, once again, it is determined whether the CMS application residing at least in part on the user terminal is able to access the data center over the network. If, at Step 2310, the CMS application is unable to access the data center, then the process returns to Step 2308 and the user continues to operate the CMS application at the user terminal in the offline mode. If, at Step 2310, the CMS application at the user terminal is able to access the data center, then the process continues to Step 2312. At Step 2312, it is determined whether there is any local transaction information stored at the user terminal as a result of shipping transactions that were conducted at the user terminal while operating in the offline mode. If there were local transactions conducted during the offline mode, then at Step 2314 the offline transaction information is synchronized with that of the data center. The process then continues to Step 2316 where all CMS application functionality is implemented and the process operates in the online mode. If, at Step 2312, there is no offline transaction information, then the process goes to Step 2316 where all CMS application functionality is implemented and the process operates in the online mode. The process ends at Step 2318.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A user terminal comprising one or more memory storage areas and one or more processors, the user terminal in communication via a network with a data center:
wherein the data center comprises (A) a central portion of carrier management system (CMS), (B) rating data comprising information to rate costs of shipping items with at least two carriers, and (C) shipping data comprising information about shipping transactions that have been processed for shipping items by the at least two carriers;
wherein the user terminal further comprises (A) one or more rating files comprising the information to rate the costs of shipping items with the at least two carriers; (B) one or more shipping files; and (C) one or more application files comprising executable code for at least a local portion of the CMS, the user terminal being configured to:
(A) wherein the user terminal is configured to, in response to operating in an online mode and able to access the data center via the network:
(i) display costs of shipping an item with the at least two carriers based at least in part on the rating data;
(ii) receive a selection of one of the at least two carriers from a user in response to the user rating the costs of shipping the item with the at least two carriers based on the displayed costs; and
(iii) process the item for shipping with the selected carrier; and
(B) wherein the user terminal is configured to, in response to operating in an offline mode and not able to access the data center via the network:
execute the one or more application files to execute the local portion of the CMS on the user terminal independent of the central portion of the CMS in order to:
(i) display of costs of shipping the item with the at least two carriers based at least in part on the information in the one or more rating files;
(ii) receive a selection of a carrier from the user in response to the user rating the costs of shipping the item with the at least two carriers based on the displayed costs; and
(iii) process the item for shipping with the selected carrier by storing a shipping transaction made while in the offline mode in at least one of the shipping files; and
(C) wherein the user terminal is configured to, in response to transferring from the offline mode to the online mode and being able to access the data center via the network:
(i) synchronize the one or more rating files with the rating data;

(ii) synchronize the one or more application files with the data center; and
(iii) synchronize the shipping data with the shipping transactions stored in the shipping files.

2. The user terminal of claim 1, wherein the user terminal further configured to process and apply shipping rates stored in the rating files to the one or more items while the user terminal is in the offline mode.

3. The user terminal of claim 1, wherein the local portion of the CMS is configured to automatically detect a connection state between the user terminal and the data center for determining whether the user terminal is to operate in the online mode or in the offline mode.

4. A method for synchronizing information on a user terminal with information on a data center in a carrier management system (CMS), the method comprising:
wherein the CMS applies carrier shipping rates to one or more items, and wherein the CMS comprises:
(a) a local portion of the CMS that resides on a user terminal, the user terminal having application files comprising executable code for executing the local portion of the CMS and rating files comprising rating information to rate costs of shipping items with at least two carriers and being configured to transfer between an online mode in which the user terminal is able to access a data center over the network and an offline mode in which the user terminal is not able to access the data center; and
(b) a central portion of the CMS that resides on the data center that is accessible by the user terminal over the network, the data center comprising rating data comprising information to rate costs of shipping items with the at least two carriers and shipping data comprising information about shipping transactions that have been processed for shipping items by the at least two carriers;
in response to the user terminal being in the online mode and able to access the data center over the network:
(a) displaying of costs of shipping an item with the at least two carriers on the user terminal by executing the central portion of the CMS, the costs of shipping the item based at least in part on the rating data;
(b) receiving a selection of one of the at least two carriers from a user in response to the user rating the costs of shipping the item with the at least two carriers based on the displayed costs; and
(c) processing the item for shipping with the selected carrier by executing the central portion of the CMS; and
in response to the user terminal being in the offline mode and unable to access the data center over the network:
(a) displaying of costs of shipping the item with the at least two carriers on the user terminal by executing the local portion of the CMS, the costs based at least in part on the information in the one or more rating files;
(b) receiving a selection of a carrier from the user in response to the user rating the costs of shipping the item with the at least two carriers based on the displayed costs; and
(c) processing the item for shipping with the selected carrier by storing a shipping transaction made while in the offline mode in at least one shipping file in memory of the user terminal; and
in response to access between the user terminal and the data center being restored:

(a) synchronizing the application files;
(b) synchronizing the rating files; and
(c) synchronizing the at least one shipping file stored on the user terminal with data center data on the data center.

5. The method of claim 4, wherein the at least one shipping file comprises item weight and dimensions, address data, "bill to" data, carrier and class of service.

6. The method of claim 4, wherein synchronizing the application files, the rating files, and the at least one shipping file stored on the user terminal with the data center data occurs automatically.

7. The method of claim 4, further comprising:
automatically detecting a connection state between the user terminal and the data center as being either connected or disconnected; and
automatically transferring the user terminal to the offline mode when the connection state is disconnected.

8. A user terminal comprising one or more memory storage areas and one or more processors, the user terminal in communication via a network with a data center:
(A) the user terminal configured to, in response to operating in an online mode and able to access the data center via a network:
(i) display costs of shipping an item with at least two carriers based at least in part on rating data;
(ii) receive a selection of one of the at least two carriers from a user; and
(iii) process the item for shipping with the selected carrier; and
(B) the user terminal configured to, in response to operating in an offline mode and not able to access the data center via the network, execute one or more application files to:
(i) display of costs of shipping the item with the at least two carriers based at least in part on the information in one or more rating files;
(ii) receive a selection of one of the at least two carriers from a user; and
(iii) process the item for shipping with the selected carrier by storing a shipping transaction made while in the offline mode in at least one shipping file; and
(C) the user terminal configured to, in response to transferring from the offline mode to the online mode and being able to access the data center via the network:
(i) synchronize the rating files with the rating data;
(ii) synchronize the one or more application files with the data center; and
(iii) synchronize the at least one shipping file with the data center.

9. The user terminal of claim 8, wherein the user terminal further configured to process and apply shipping rates stored in the rating files to the item while the user terminal is in the offline mode.

10. The user terminal of claim 8, wherein the user terminal is configured to automatically detect a connection state between the user terminal and the data center for determining whether the user terminal is to operate in the online mode or in the offline mode.

11. A method for synchronizing information on a user terminal with information on a data center, the method comprising:
(A) in response to the user terminal being in the online mode and able to access the data center over the network:
(i) display of costs of shipping an item with at least two carriers based at least in part on rating data;

(ii) receiving a selection of one of the at least two carriers from a user; and
(iii) processing the item for shipping with the selected carrier; and (B) in response to the user terminal being in the offline mode and unable to access the data center over the network, executing one or more application files to:
(i) display of costs of shipping the item with the at least two carriers based at least in part on the information in one or more rating files;
(ii) receive a selection of one of the at least two carriers from a user; and
(iii) process the item for shipping with the selected carrier by storing a shipping transaction made while in the offline mode in at least one shipping file; and (C) in response to access between the user terminal and the data center being restored:
(i) synchronize the rating files with the rating data;
(ii) synchronize the one or more application files with the data center; and
(iii) synchronize the at least one shipping file with the data center.

12. The method of claim 11, further comprising processing and applying shipping rates stored in the rating files to the item while the user terminal is in the offline mode.

13. The method of claim 11, further comprising automatically detecting a connection state between the user terminal and the data center for determining whether the user terminal is to operate in the online mode or in the offline mode.

* * * * *

UNITED STATES PATENT AND TRADEMARK OFFICE
CERTIFICATE OF CORRECTION

PATENT NO. : 10,127,516 B2  
APPLICATION NO. : 14/838886  
DATED : November 13, 2018  
INVENTOR(S) : David A. Bennett et al.

Page 1 of 1

It is certified that error appears in the above-identified patent and that said Letters Patent is hereby corrected as shown below:

On the Title Page

Column 01, (Inventors), Line 09: Please remove "Everret" and replace with --Everett--.
Column 01, (Inventors), Line 13: After "William W. Smith," insert --III--.

In the Specification

Column 02, Line 05: Please remove "Etc./UPS" and replace with --Etc., The UPS--.
Column 05, Line 44: Please remove "invention." and replace with --invention;--.
Column 05, Line 49: Please remove "invention." and replace with --invention;--.
Column 16, Line 41: Please remove "FIG. 7," and replace with --FIG. 7A,--.
Column 16, Line 61: Please remove "the <CMS" and replace with --<the CMS--.
Column 16, Line 62: Please remove "files."<The" and insert --files." <The--.
Column 17, Line 11: Please remove "<the" and replace with --<The--.

Signed and Sealed this  
Twenty-fifth Day of December, 2018

Andrei Iancu  
*Director of the United States Patent and Trademark Office*